(12) United States Patent
Radkowitsch et al.

(10) Patent No.: US 7,824,135 B2
(45) Date of Patent: Nov. 2, 2010

(54) DRILL, AND DRILLING METHOD

(75) Inventors: Wolfgang Radkowitsch, Neunkirchen (AT); Klaus Metzner, Wr. Neustadt (AT); Friedrich Bleicher, Vienna (AT)

(73) Assignee: Schoeller-Bleckmann Oilfield Technology GmbH & Co. KG, Ternitz (AT)

( * ) Notice: Subject to any disclaimer, the term of this patent is extended or adjusted under 35 U.S.C. 154(b) by 925 days.

(21) Appl. No.: 10/588,040

(22) PCT Filed: Jan. 27, 2005

(86) PCT No.: PCT/AT2005/000021

§ 371 (c)(1),
(2), (4) Date: Feb. 21, 2007

(87) PCT Pub. No.: WO2005/072897

PCT Pub. Date: Aug. 11, 2005

(65) Prior Publication Data

US 2007/0172323 A1    Jul. 26, 2007

(30) Foreign Application Priority Data

Feb. 2, 2004    (AT) ............................... A 142/2004

(51) Int. Cl.
*B23B 35/00* (2006.01)
*B23B 51/06* (2006.01)

(52) U.S. Cl. .................. 408/1 R; 408/8; 408/57; 408/147; 408/199

(58) Field of Classification Search ............... 408/1 R, 408/2, 8, 10, 11, 16, 56, 57, 59, 146, 147, 408/199
See application file for complete search history.

(56) References Cited

U.S. PATENT DOCUMENTS 1,304,981 A    5/1919    Hoagland (Continued)

FOREIGN PATENT DOCUMENTS

CA    1 298 104    3/1992

(Continued)

OTHER PUBLICATIONS

Zelinski, Peter, "Deep Thinking," Internet Article, Online, Jun. 2003 (2003-2006), pp. 1-2, XP002326416 Retrieved from Internet: URL: http://www.mmsonline.com/articles/060303.html>.

(Continued)

*Primary Examiner*—Daniel W Howell
(74) *Attorney, Agent, or Firm*—Collard & Roe, P.C.

(57) ABSTRACT

The invention relates to a drill (4) and a device or a method for drilling boreholes in workpieces (3), in which a periodically acting radial force (19) is exerted on the drill head (5) of the drill (4). The drill head (5) of the drill (4) has a cutting edge (52) extending only over a part of the diameter D (51) and is designed to have a lateral, V-shaped chip removing groove or bead (59) and with a channel (12) with an outlet opening (56) in the drill head (5) for supplying a drill fluid (9). On a drill side (61) of the drill head (5) opposite the bead (59) between a first and a second cylinder casing partial surface (64, 65) of the drill head (5) a rear offset (63) is formed which reduces the cross section of the drill head (5) in relation to an enclosing cylinder casing surface (61) of the drill head (5).

96 Claims, 8 Drawing Sheets

U.S. PATENT DOCUMENTS

| | | | |
|---|---|---|---|
| 2,922,323 | A | 1/1960 | Weidner |
| 3,120,766 | A | 2/1964 | Zagar |
| 3,635,108 | A | 1/1972 | Prince |
| 3,644,049 | A | 2/1972 | Hahn et al. |
| 3,817,647 | A | 6/1974 | Lemelson |
| 3,827,823 | A * | 8/1974 | Lhomme ............... 408/158 |
| 4,279,550 | A | 7/1981 | Kress et al. |
| 4,395,169 | A | 7/1983 | Kashiwagi et al. |
| 4,775,926 | A | 10/1988 | Hasegawa et al. |
| 4,813,824 | A | 3/1989 | Grunsky |
| 4,831,785 | A | 5/1989 | Sigg et al. |
| 4,957,398 | A * | 9/1990 | Schneider et al. ......... 409/136 |
| 5,174,695 | A | 12/1992 | Bathen et al. |
| 5,217,332 | A | 6/1993 | Takasaki et al. |
| 5,251,511 | A | 10/1993 | Muendlein et al. |
| 5,443,585 | A | 8/1995 | Kawase et al. |
| 5,444,205 | A | 8/1995 | Lodetti et al. |
| 5,544,985 | A | 8/1996 | Lane et al. |
| 5,755,537 | A | 5/1998 | Lubbering et al. |
| 5,915,890 | A | 6/1999 | Rittweger et al. |
| 6,196,773 | B1 * | 3/2001 | Hyatt et al. .............. 408/1 R |
| 6,243,962 | B1 * | 6/2001 | Brock ..................... 33/542 |
| 6,270,295 | B1 * | 8/2001 | Hyatt et al. .............. 408/1 R |
| 6,536,998 | B2 * | 3/2003 | Hyatt et al. .............. 408/147 |
| 6,586,862 | B1 | 7/2003 | Cselle |
| 7,090,445 | B2 * | 8/2006 | Woodruff et al. ............ 408/59 |
| 7,290,965 | B2 * | 11/2007 | Gaiser et al. ............. 409/132 |

FOREIGN PATENT DOCUMENTS

| | | |
|---|---|---|
| DE | 1 552 463 | 7/1970 |
| DE | 1 949 248 A1 | 4/1971 |
| DE | 25 02 183 A1 | 7/1976 |
| DE | 33 14 718 A1 | 10/1984 |
| DE | 37 20 837 A1 | 10/1987 |
| DE | 36 15 940 A1 | 11/1987 |
| DE | 36 29 033 C2 | 3/1988 |
| DE | 37 05 852 A1 | 9/1988 |
| DE | 4 115 512 A1 | 11/1992 |
| DE | 43 12 937 A1 | 10/1994 |
| DE | 44 30 331 A1 | 2/1996 |
| DE | 94 22 389 U1 | 8/2001 |
| DE | 102 29 134 A1 | 1/2004 |
| DE | 102005022197 A1 * | 11/2006 |
| EP | 0 491 670 A2 | 6/1992 |
| EP | 0 768 136 A1 | 4/1997 |
| EP | 0 838 304 A2 | 4/1998 |
| EP | 1 291 104 A1 | 3/2003 |
| EP | 1 428 601 A1 | 6/2004 |
| FR | 1369076 A | 8/1964 |
| FR | 2 287 679 A | 5/1976 |
| GB | 797 557 A | 7/1958 |
| GB | 1 415 137 | 11/1975 |
| GB | 1 435 166 A | 5/1976 |
| JP | 59-069207 | 4/1984 |
| JP | 63-102813 | 5/1988 |
| JP | 03026412 A * | 2/1991 |
| JP | 08136375 A * | 5/1996 |
| SU | 732087 A1 * | 3/1978 |
| SU | 1685628 A1 * | 10/1991 |
| SU | 1815009 A1 * | 5/1993 |
| WO | WO 01/64365 A1 | 9/2001 |
| WO | WO 2005084862 A1 * | 9/2005 |

OTHER PUBLICATIONS

Xu, W.L. et al., "Piezoelectric Actuator Based Active Error Compensation of Precision Machining", *Measurement Science and Technology*, IOP Publishing, Feb. 1999, Bristol, GB, vol. 10, No. 2, pp. 106-111, XP000893426.

Pestunov, V. M., "Compensation of Elastic Deformation of a Machine-Tool Manufacturing System", *Russian Engineering Research*, Allerton Press, 1999, New York, NY, US, vol. 19, No. 4, pp. 92-97, XP000935525.

International Search Report dated Aug. 31, 2005.

* cited by examiner

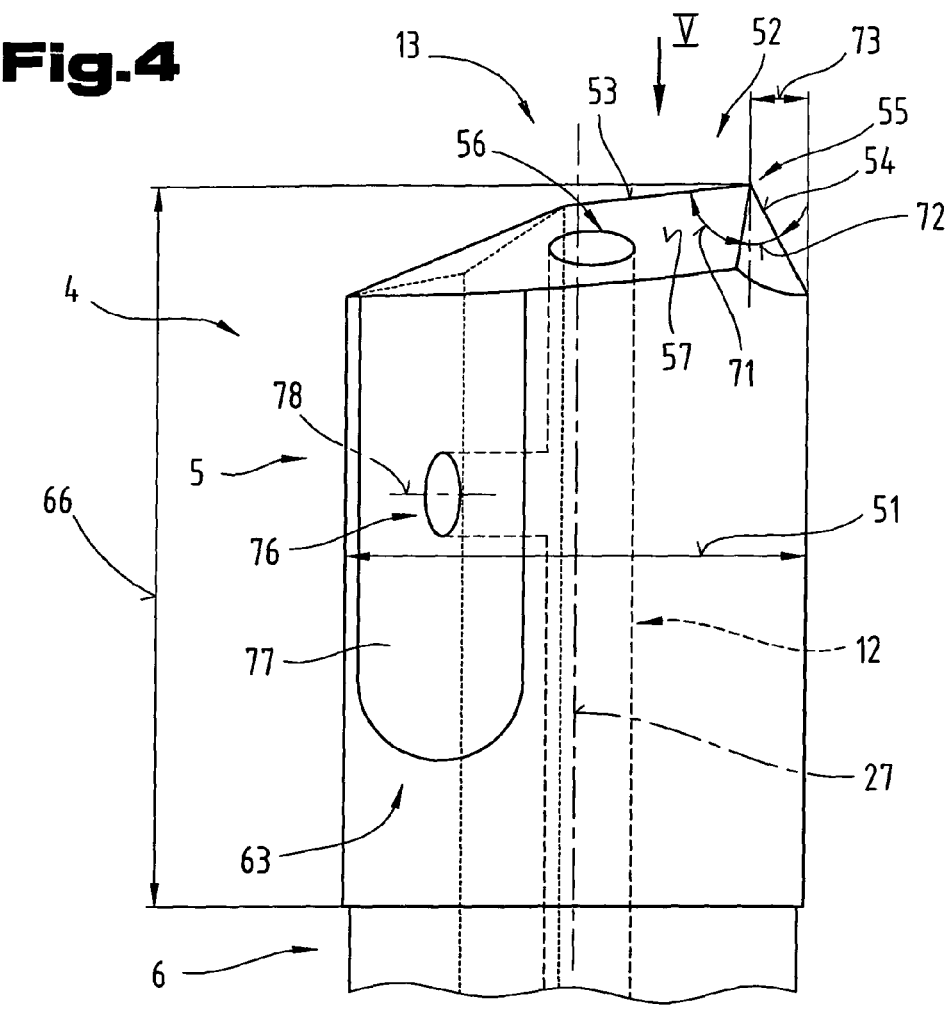
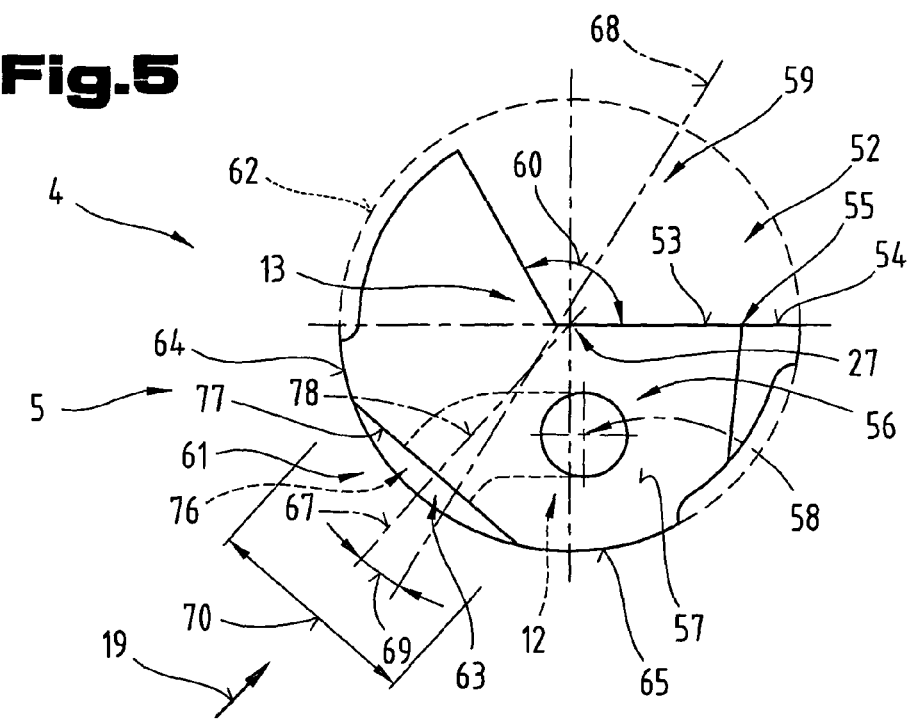

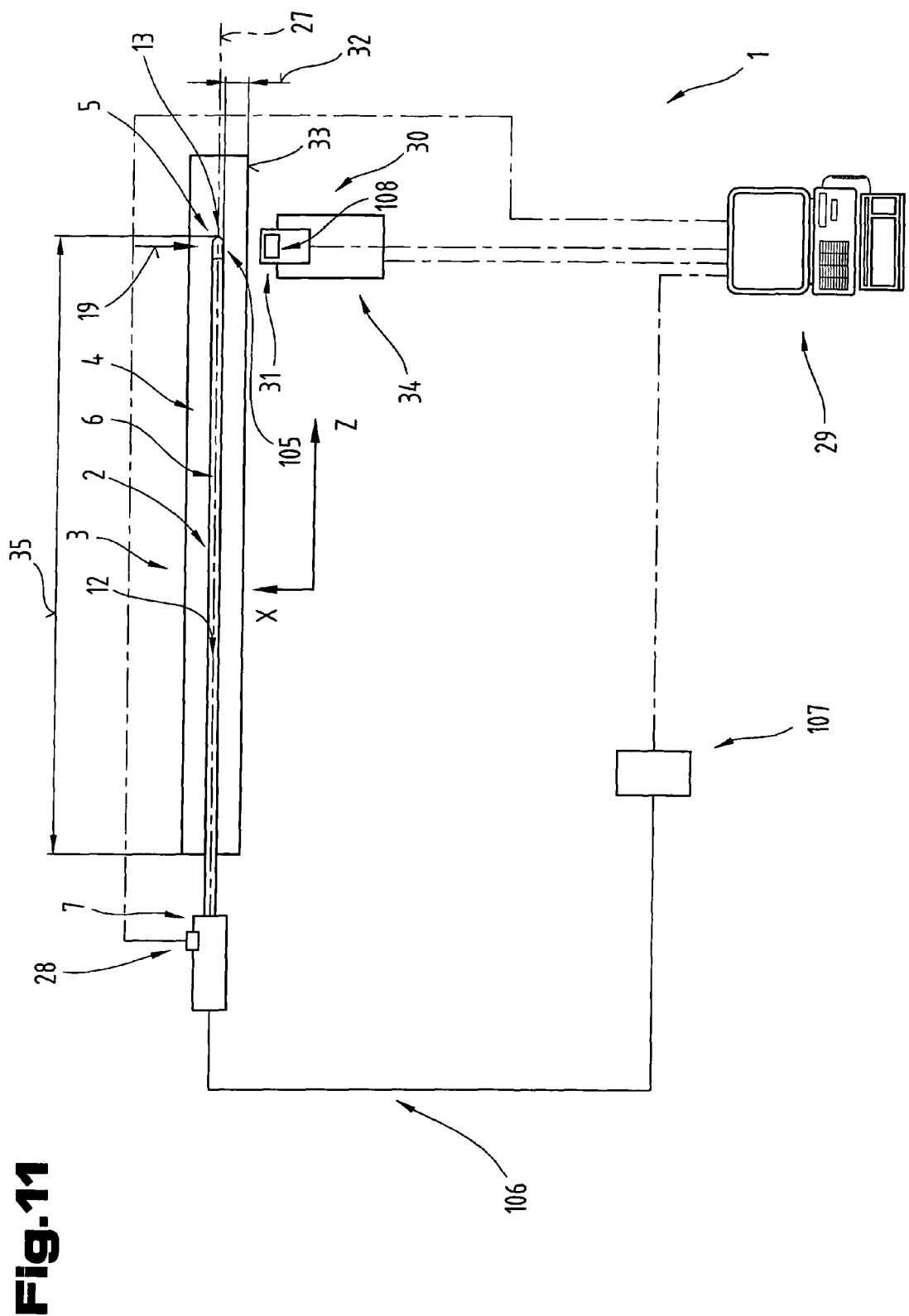

DRILL, AND DRILLING METHOD

CROSS REFERENCE TO RELATED APPLICATIONS

Applicants claim priority under 35 U.S.C. §119 of Austrian Application No. A 142/2004 filed Feb. 2, 2004. Applicants also claim priority under 35 U.S.C. §365 of PCT/AT2005/000021 filed Jan. 27, 2005. The international application under PCT article 21(2) was not published in English.

The invention relates to a method and a device for drilling deep boreholes in workpieces and a drill for such a device, according to the preambles of claims 1, 29, 53 and 67.

Deep bores are defined as bores where the ratio of the bore depth to the diameter is equal to or greater than 5 to 10. In engineering terms at bore depths with diameter ratios from about 100 very high demands have to be accommodated. At bore depths with diameter ratios of this size it becomes increasingly difficult to ensure a straight, longitudinal dimension for the borehole. The use of so-called single-lipped drills has proved to be economically advantageous for boring deep bores.

A single-lipped drill of this kind is known for example from DE 36 29 033 C2. In this document a single-lipped drill is described with a coolant feeding channel and a drill head supporting a cutting plate. The drill head made from a solid hard metal is secured to a drill shaft, whereby the coolant feeding bore is formed by a common axially aligned bore in the drill shaft and the drill head. The drill shaft is provided with a V-shaped chip removal groove or bead.

From document DE 44 30 331 A1 a method and a device are known for influencing the progress of deep bores. The longitudinal dimension of the borehole is influenced by a pressure piece inserted into the gap between the bore and the drill rod or drill shaft, by means of which the drill shaft is bent specifically in one direction and the drill head is forced into the desired direction. By these means it should be possible to return an already started bore back into the desired direction or to stop such a misalignment from occurring.

The objective of the invention is to provide a device and a method for drilling deep bores by which the efficiency of influencing the longitudinal dimension of the borehole can be improved. A further objective of the invention is to provide a device and a method by means of which the longitudinal dimension of the borehole can be influenced in an automated way as far as possible.

The objective of the invention is achieved by means of the drill according to the features of claim 1. The advantage here is that the lateral rear offset on the drill head of the drill is provided for forming a volume between the corresponding surface area of the drill head and the side wall of the bore into which the drill is inserted. Drill fluid, which is brought into the area of the drill head during drilling, fills this volume and forms a pressure cushion which exerts as a reaction force a lateral radial force on the drill head. The drill according to the invention thus has the advantage that a radial force can be exerted specifically on the drill head, and thus the direction of the longitudinal dimension of the borehole can be influenced.

According to a development of the drill a normal to the surface of the rear offset with the angle halving ends of the V-shaped chip removal groove or bead of the drill encloses an angle, selected from a range of −50° to +50°, preferably from a range of −30° to +30°. It is advantageous here that by selecting this angle of the normal to the surface of the rear offset on the drill head an optimal alignment of the radial force can be achieved to support the force of the cutting edge on the workpiece to be processed.

In addition, the rear offset is positioned at an end part of the drill head facing the drill tip and extends in axial direction and/or the rear offset is designed to have certain width, whereby the ratio between the diameter of the drill head and the width of the rear offset has a value from a range of 0.1 to 0.8. The advantage of this is that in this way a sufficiently large volume is available for forming the pressure cushion of the drill fluid with a sufficiently large effective cross sectional surface to produce the radial force. The developments of the drill according to claims 10 to 17 have the advantage that by means of the corresponding design of the cutting edge of the drill head the lateral deflection ability is particularly effective due to the action of a radial force on the drill head.

The design of the drill, in which in a surface area of the drill head formed by the rear offset a second outlet opening is arranged for letting the drill fluid flow out into the region of the drill head, has the advantage that in this way, the pressure wave introduced by the pulsating flow of drill fluid is directed directly against the side wall of the drill and thereby its action is assisted.

By means of the design of the drill in which the opening axis of the outlet opening is inclined in the region of the rear offset relative to the normal to the surface of the rear offset, and said inclination has a value from a range of 0° to 70°, there is an advantage in that in this way the pressure wave introduced by the outflowing drill fluid produces a reaction force by which the cutting edge force is supported, i.e. the radial force introduced by the pressure wave and the cutting edge force have almost the same dimensional direction.

According to a further embodiment, next to the outlet opening in the surface area of the rear offset there is a further outlet opening in a surface area of the drill head formed by the bead, whereby said further outlet opening is arranged in an area of the drill head further apart from the drill tip of the drill head. The advantage of this is that with a drill of this kind there is the possibility of torque changing the direction of the axis of rotation. Thus with this drill there is an additional independent way of influencing the longitudinal progress of the borehole, i.e. in addition to the action of a radial force the action of a torque on the drill head is also possible.

According to an alternative embodiment, in the region of the rear offset on the drill head a piezoelectric element is arranged and said piezoelectric element is designed to have a bearing side, whereby the bearing side is designed to be in alignment with the enclosing cylinder casing surface of the drill head. The advantage of this is that in this way, a radial force acting on the drill head can only be produced by the introduction of electric pulses. In this way it is also possible to generate rotationally synchronous radial forces at very high speeds of the drill.

It is also possible for the drill head of the drill to have an element emitting electromagnetic radiation or for this element to be formed by a piece of a chemical element emitting gamma radiation. This has the advantage that in cooperation with a radiation detector which is guided up from the outside against the workpiece, the distance from the surface of the workpiece and then the dimensional direction of the borehole can be measured. It is advantageous in this case in particular that this measurement can also be carried out continuously without interrupting the drilling procedure.

The objective of the invention is also solved independently by a device for drilling a borehole in a workpiece according to the features of claim 29. It is an advantage here that in this way the drill fluid circuit required for the drilling process, by means of which drill fluid required for cooling and lubricating the drill is fed into the borehole, can also be used at the same time to influence specifically the direction of the longitudinal dimension of the borehole.

A further development of the device for drilling a borehole is also advantageous, according to which the drill fluid circuit comprises a pulse line with a valve, whereby the pulse line branches off immediately before the rotary transfer from the feed line for the drill fluid into the drill. In this way the periodic, rotationally-synchronous pressure pattern of the drill fluid, necessary for generating the radial force acting in a desired rotational angular area, is produced solely by briefly opening or closing the valve in the pulse line. Thus in addition to a pump for generating the drill fluid flow no additional pump is required to generate the pulsing pressure pattern.

It is also provided, that in the drill fluid circuit of the device a filter device with a coarse filter or fine filter is provided for the drill fluid. In this way any friction caused by dirt particles, which are transported with the drill fluid, is largely avoided at the valve or control edges of the valve, and thus the lifetime of the valve is greatly increased.

A design of the device is also advantageous in which the supply line and/or the pulse line of the drill fluid circuit are formed by a line which has a high resistance to radial or longitudinal stretching. In this way any undesired reductions in the pressure pulses of the periodic pressure pattern of the drill fluid are avoided as well as too great a flattening of the rising or falling slopes of the pressure pattern.

It is also provided that the device comprises a measuring device for measuring the longitudinal dimension of the borehole. This makes it possible in an advantageous manner to coordinate the radial force with the respective position or deviation of the drill head from the desired longitudinal direction of the borehole.

It is also provided that the device for drilling the borehole comprises a control device which is connected with the rotary sensor, the measuring device and the valve. This means that the drilling process can be carried out as far as possible in an automated manner.

According to a development of the device, the latter also comprises a drill pipe with a drill bush and a drill bush shaft, whereby in the drill bush an eccentrically arranged drill guiding hole is formed and the drill guiding hole is aligned obliquely relative to the longitudinal middle axis of the drill bush. By means of this drill pipe there is a further possibility of radial force acting on the drill, in that by means of the drill pipe and a further drill with a smaller diameter, which can be guided through the drill guiding hole of the drill bush, a so-called eccentric taphole bore or eccentric prebore can be produced. With the subsequent continuation of drilling the borehole with the original drill of diameter D, said drill then on penetrating into the prebored borehole experiences a corresponding radial force due to the eccentric arrangement.

The objective of the invention is solved independently by a device according to the features of claim 53. It is an advantage in this case that the periodic pressure pulses for generating radial force can be generated solely by the introduction of electric pulses to the piezoelectric element.

Advantageous developments of this device are also described in claims 54 to 66.

A further independent solution to the problem of the invention is provided by the method according to the features of claim 67. The advantage here is that by means of this method a borehole can be produced with the desired longitudinal dimension. If the longitudinal direction of the borehole is measured during the drilling procedure, the direction and the size of the radial force acting thereon can be controlled to produce a borehole in the workpiece that is as straight as possible. Furthermore, it is also possible by means of this method to produce a borehole with a curved, i.e. non linear path, in that during the advancement of the drill into the workpiece the direction and size of the radial force which acts on the drill head, as well as the angular area or the so-called opening angle via which the radial force acts, can be controlled accordingly.

Further advantageous variants of the method are described in claims 68 to 97.

For a better understanding of the invention the latter is explained in more detail by way of the following figures.

In a schematically simplified view:

FIG. 4 shows a further embodiment of the drill with a second outlet opening in side view;

FIG. 5 shows a plan view of the drill head of the drill according to FIG. 4;

FIG. 11 shows a further embodiment of the device for drilling a borehole in a workpiece;

Firstly, it should be noted that in all of the variously described embodiments, the same parts are given the same reference numbers and same component names, whereby the disclosures contained throughout the description can be applied to the same parts with the same reference numbers or same component names. Also the details on position used in the description such as e.g. top, bottom, side etc. refer to the figure currently being described and shown at the time and if there is a change in position these should be changed to relate to the new positions. Furthermore, individual features or combinations of features of the embodiments shown and described represent in themselves independent, inventive solutions according to the invention.

Figure 1:
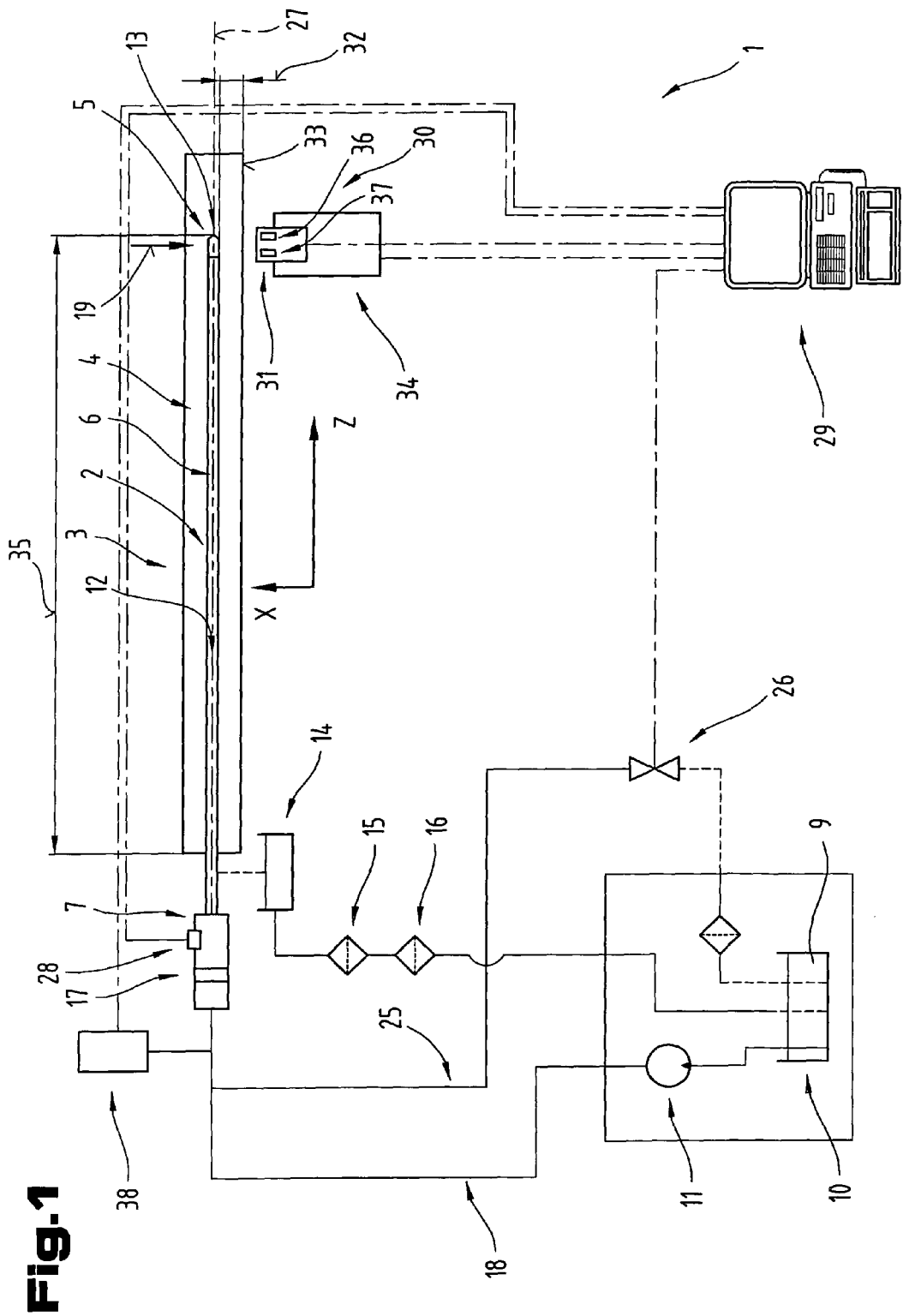
FIG. 1 shows a device for drilling a deep borehole in a workpiece.

FIG. 1 shows a device 1 for drilling a deep borehole 2 in a workpiece 3 in a schematically simplified view. By way of FIG. 1 the functioning of the method according to the invention for drilling deep boreholes is explained in more detail.

The workpiece 3 is secured onto a clamping table of a deep drilling machine (not shown). The workpiece 3 is a longitudinally extended part, in which the borehole 2 is aligned approximately parallel to the longitudinal extension of the workpiece 3. The borehole 2 is produced by means of a drill 4, which is formed by a drill head 5 and a drill shaft 6 supporting the latter. The drill 4 is driven by a drill spindle 7, in which the drill shaft 6 is secured.

The device 1 also comprises a drill fluid circuit 8 for a cooling lubricant or drill fluid 9. During the drilling with the drill 4 the drill fluid is suctioned out of a tank 10 by a pump 11 and is pumped through a channel 12 in the drill shaft 6 or the drill head 5 to the drill head 5 or a drill tip 13. Together with the shavings the drill fluid 9 leaves the borehole 2 and is collected in the region of the drill spindle 7 in a collecting container 14. After this the drill fluid 9 is passed through a coarse filter 15 and a fine filter 16 and then returns to the tank 10. In order to introduce the drill fluid 9 into the channel 12 of the drill shaft 6 a rotary transfer 17 is provided on the drill spindle 7 by means of which a supply line 18 for the drill fluid 9 is coupled with the channel 12 and the drill shaft 6.

According to this embodiment the longitudinal dimension of the borehole 2 is achieved by introducing a radial force 19 acting periodically over a predeterminable rotational angular area, whereby said radial force 19 is generated by the fluctuations in pressure of the drill fluid 9.

To generate the periodic pressure fluctuations a pulse line 25 is provided, which opens shortly before the rotary transfer 17 into the supply line 18. The pulse line 25 leads to a valve 26, which is preferably in the form of a servovalve. By opening the valve 26 a partial flow of the drill fluid 9 is diverted, which results in a corresponding reduction in the pressure of the drill fluid 9. By periodically opening and closing the valve 26 the pressure of the drill fluid 9 in the channel 12 of the drill 4 or in the region of the drill tip 13 acts in a periodically pulsating manner. As described in the following, it is possible by means of the fluctuations in pressure of the drill fluid 9 in the region of the drill tip 13 to generate a periodically acting radial force 19 on the drill head 5, by means of which the longitudinal dimension of the borehole 2 can be influenced specifically. According to the desired radial direction or the desired rotational angle range of the radial force 19, the periodically pulsing pressure of the drill fluid 9 is synchronised with the rotation of the drill head 5 or the drill 4.

By making the valve 26 a servovalve, the periodically changing pressure patterns of the drill fluid 9 can be generated in an advantageous manner, whereby rising and falling slopes in the profile of the pressure pattern can be flattened in a specific manner. Rapid rises or falls in the pressure pattern are thus prevented and an excessive mechanical loading of the various components of the drill fluid circuit 8 and the workpiece 3 is avoided.

In order to determine the current relative position of the drill head 5 of the drill 4 in relation to a rotation about a drill axis 27, a rotary sensor 28 is arranged in the region of the drill spindle 7. By means of said rotary sensor 28 both the current angular position of the drill head 5 relative to the drill axis 27 and the angular speed or rotational speed of the drill 4 can be measured. The rotary sensor 28 is preferably formed by a light barrier and an aperture or aperture disc secured to the drill spindle 7. In order to synchronise the periodic pressure fluctuations of the drill fluid 9 with the rotational movement of the drill 4 the device 1 is designed with a control device 29, by means of which the signals of the rotation sensor 28 can be detected and on the other hand the valve 26 in the pulse line 25 can be opened or closed accordingly. The control device 29 is preferably in the form of a personal computer.

So that the borehole 2 can be drilled with the desired longitudinal dimension, the device 1 is equipped with a measuring device 30 which is also connected by signal with the control device 29. The measuring device 30 has a measuring head 31 by means of which the dimensional longitudinal direction of the borehole 2 or the current position of the drill head 5 of the drill 4 can be measured. This is preferably performed by measuring a radial distance 32 of the drill head 5 or the borehole 2 from a surface 33 of the workpiece closest to the borehole 2. The measuring head 31 of the measuring device 30 is mounted on a measuring head support 34, by means of which it moves along the surface 33 of the workpiece 3 and can be aligned in its dimensional position. The control device 29 also controls the measuring head support 34. In addition to the measuring signals of the measuring head 31 of the measuring device 30 the control device 29 also picks up data from a position measuring device, with which the measuring head support 34 is connected, from which the current position of the measuring head 31 can be determined. Furthermore, by driving corresponding stepping motors or pneumatic cylinders the measuring head 31 is displaced on the surface 33 of the workpiece 3. The measuring head 31 is preferably guided along with the drill head 5 during the drilling of the borehole 2 according to a depth 35 of the borehole 2 by movement in Z-direction. If a measurement of the radial distance 32 needs to be taken, the measuring head 31 is guided by means of the measuring head support 34 in X-direction to the surface 33 of the workpiece 3, and then the radial distance 32 can be detected by the measuring head 31. The detection can be made by displacing the measuring head 31 in Y-direction, i.e. in a direction perpendicular to the plane of the drawing of FIG. 1 or in a direction perpendicular to the X-Z plane, at different Y positions of the measuring head 31. From the different values of the radial distance 32 from various Y positions, by triangulation, the position of the borehole 2 relative to the corresponding Z value can be calculated. The X-Y values found by the measurement of the radial distance 32 of the borehole 2 can also be interpreted as the average deviation of the borehole 2, in that the respective X-Y values are related to the X or Y value of the start of the borehole 2, i.e. for an ideally straight borehole 2 the differences between the X-Y values to any Z-values of the borehole 2 and the X-Y value of the start of the borehole should always be 0.

The measuring device 30 for measuring the longitudinal dimension of the borehole 2 is preferably an ultrasound siting system. The radial distance 32 is thus measured by means of the transit time of a sound pulse reflected accordingly at the borehole 2 or the drill head 5. For this the measuring device 30 has at least one ultrasound transmitter 36 and at least one ultrasound receiver 37. The ultrasound transmitter 36 and the ultrasound receiver 37 are preferably arranged in a common ultrasound measuring head or the common measuring head 31.

Prior to commencing the measuring procedure with the measuring device 30 in the region between the measuring head 31 and the surface 33 of the workpiece 3 an electrolube is inserted from an electrolube container, by means of which any undesirable attenuation of the ultrasound signals is kept as low as possible on the surface 33.

A measurement of the radial distance 32 by the measuring device 30 can be initiated either by a control signal from the control device 29 or by a machine operator. The measuring head 31 with the ultrasound transmitter 36 and the ultrasound receiver 37 is then pushed by means of a pneumatic linear guide (not shown) of the measuring head carrier 34 to the surface 33 of the workpiece 3. After the supply of electrolube the radial distance 32 is measured at two different Y-positions of the measuring head 31. From the distances 32 to the respective Y-positions of the measuring head 31 the corresponding X and Y value of the borehole 2 to the actual Z position of the measuring head 31 is calculated. By means of the corresponding measurements and calculations of the X and Y values of the borehole 2 to consecutive Z positions of the measuring head 31 the longitudinal dimension of the borehole 2 can be determined.

If this measurement establishes an excessive deviation from the desired—usually straight—longitudinal dimension of the borehole 2, by means of the control device 29 firstly the direction required to correct this deviation or the corresponding rotational angular area of the radial force 19 is calculated. In combination with the actual speed or angular speed of the drill 4 which is determined by the rotary sensor 28 the control device 29 then calculates the required time characteristic of the periodic change in pressure of the drill fluid 9 or a frequency and phase position for opening of closing the valve 26 to generate corresponding fluctuations in pressure or pressure pulses of the drill fluid 9. In this case the frequency of the pressure fluctuations of the drill fluid 9 is usually equal to the speed of the drill 4. A specific rotational angular region for the radial force 19 can be achieved in that the pressure fluctuations are generated with a corresponding temporal phase shift relative to a defined initial position of the drill head 5. The initial position corresponds to the relative angular position of the drill head 5 in relation to the drill spindle 7. Angle values for radial directions relative to the fixed workpiece 3 are thus converted into corresponding fractions of the duration of rotation of the drill 4. This is performed preferably in an automated manner by the control device 29.

In the described method for generating radial force 19 by generating rotational-synchronous pressure fluctuations of the drill fluid 9, the control device 29 considers additional influencing variables for calculating the time characteristic of the periodic change in pressure of the drill fluid 9. The relative angular position of the drill head 5 in relation to the drill spindle 7 is determined on clamping the drill 5 into the drill spindle 7 and is thus known. This relative angular position of the drill head is changed by the drilling of the drill 4 due to the torsion acting on the drill head 5. This change of the relative angular position is in turn influenced by forces acting on the cutting edge on the drill head 5, but can be considered at least approximately by the control device 29. The delayed generation of radial force 19 due to the final spreading speed of the pressure pulses in the lines of the drill fluid circuit 8 or the channel 12 in the drill 4 also need to be taken into account. The actuation of the valve 26 thus needs to be carried out earlier by the control device 29 according to the running time of pressure pulses in the lines. A determining factor for this are the lengths of the lines or the channel 12 and the speed of sound spreading in the drill fluid 9. In order to measure the actual time characteristic of the pressure of the drill fluid 9 a pressure sensor 38 is arranged at least in the supply line 18 of the drill fluid circuit 8. This pressure sensor 38 is preferably positioned in the vicinity of the rotary transfer 17 on the drill spindle 7.

In general, the frequency for the time characteristic of the periodic pressure fluctuations or pressure pulses of the drill fluid 9 is selected to be equal to the speed of the drill 4, i.e. with each rotation of the drill 4 a pressure pulse is introduced through the drill head 5 into the borehole 2. According to an alternative embodiment variant of the method according to the invention the introduction of pressure pulses does not occur with each rotation of the drill 4. Thus for example it may be that a pressure pulse of the drill fluid 9 to generate radial force 19 is only introduced after two, three, four etc. rotations. This means that the ratio of the frequency of rotation of the drill 4 or the speed of the drill 4 and the frequency of the time characteristic of the periodic change of the pressure or pressure pulses of the drill fluid 9 is a whole number, i.e. for example 2, 3, 4 etc. This procedure of generating the pressure pulses of the drill fluid 9 with the control device 29 with a frequency which corresponds only to a fraction of the speed of the drill 4, has the advantage of also being able to influence the strength or intensity of the deflection of the drill head 5 to influence the longitudinal dimension of the borehole 2. Only by a corresponding reduction in the frequency of the periodic pressure pattern can the curvature of the borehole 2 be reduced, in that during the penetration of the drill 4 into the workpiece 3 fewer pressure pulses act upon the drill head 5. This means that the pressure pulses deflecting the drill head 5 are distributed over a greater longitudinal area of the depth 35 of the borehole 2. A further advantage is that by means of the lower frequency of the pressure pulses of the drill fluid 9 the mechanical load on the valve 26 is suitably lower.

For the drill fluid 9 commercially available drill oils are used with a viscosity at 40° C. of up to a maximum of 30 mm$^2$/sec. The drill fluid 9 preferably has a viscosity at 40° C. from a range of up to max. 22 mm$^2$/sec. Pressure in the region of at least 60 bar is generated to produce the radial force 18 by means of the pump 11 of the drill fluid circuit 8. As a time changeable components of the pressure, pressure differences are used from a range of 15 to 30 bar. In order to generate a greater radial force 19 by way of greater pressure differences, pressure from the region of at least 160 bar or even pressure from the region of at least 300 bar is generated by the pump 11. Depending on the material strength of the workpiece 3 it is also possible for the pressure of the drill fluid 9 to be used from in the region of at least 600 bar. In special cases it is also possible for the pressure of the drill fluid 9 to be in the region of at least 4,000 bar. For this it is provided that the lines forming the drill fluid circuit 8, i.e. at least the supply line 18 and the pulse line 25 are made from materials which have high resistance to radial or longitudinal extension or have a high elasticity module. In this way undesired pressure losses of the pressure pulses directed to the drill tip 13 for generating the radial force 19 can be prevented as far as possible.

Figure 2:
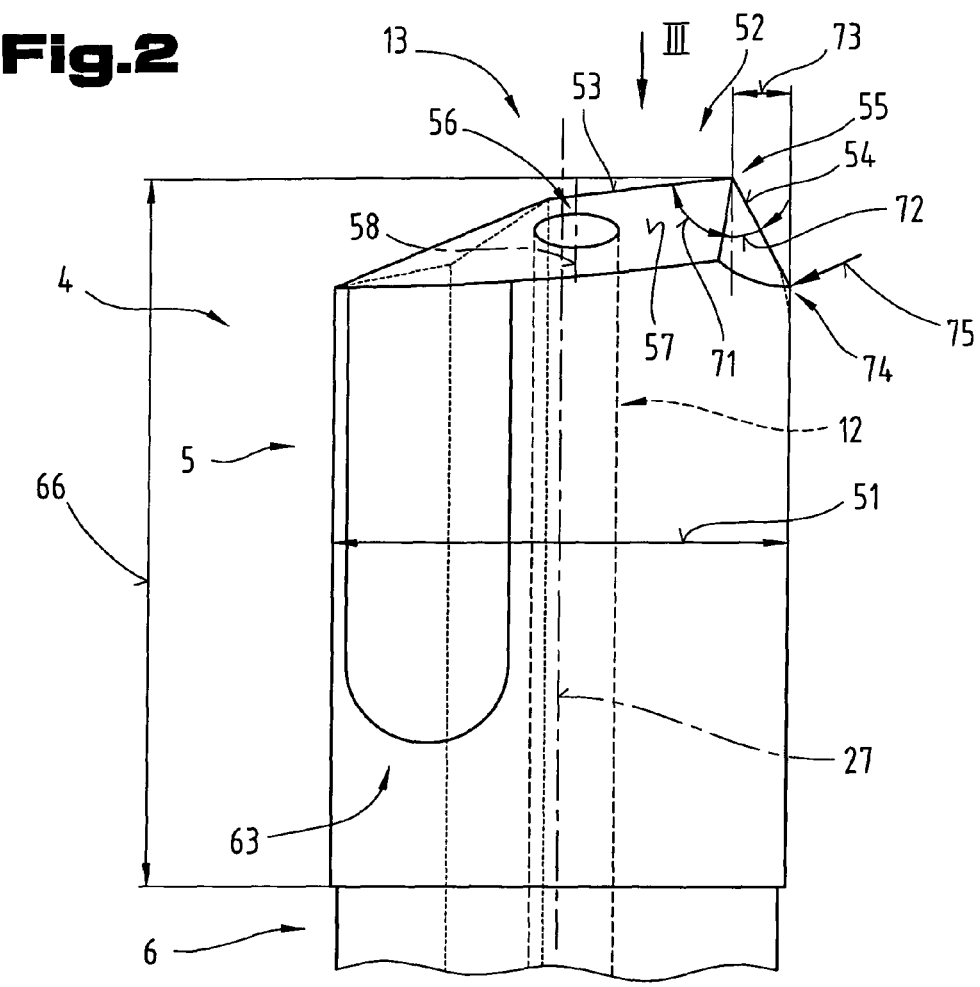
FIG. 2 shows a side view of the drill viewed from a direction perpendicular to the drill axis.
Figure 3:
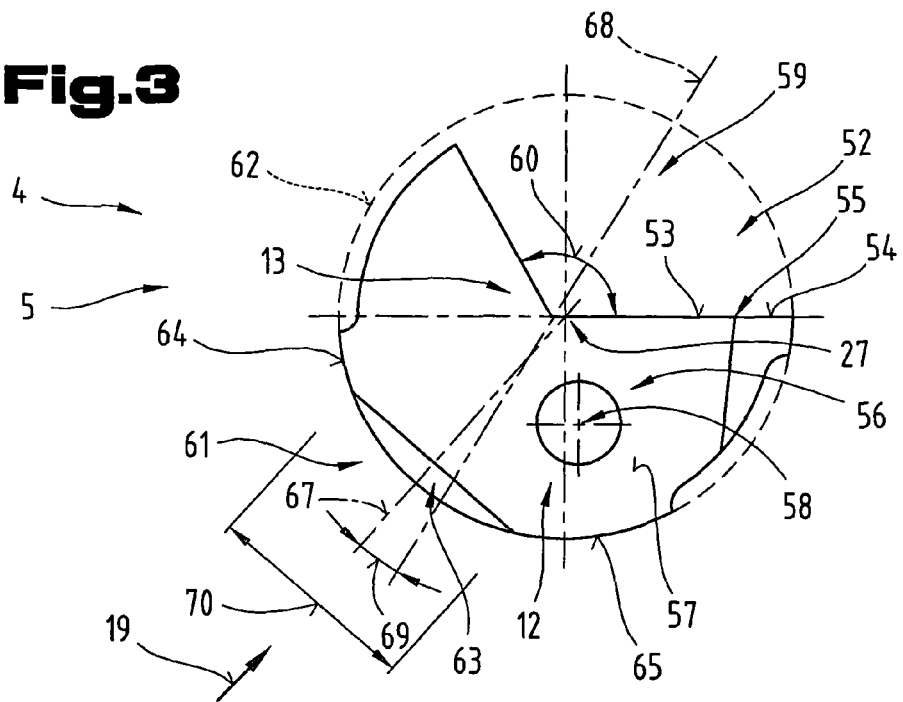
FIG. 3 shows a plan view of the drill head of the drill according to FIG. 2.

By way of the following FIGS. 2 and 3 a first embodiment of the drill 4 according to the invention is described.

FIG. 2 shows a side view of the drill 4 as viewed from a perpendicular direction relative to the drill axis 27. Here only a short piece is shown of the drill shaft 6 supporting the drill head 5 of the drill 4. The basic shape of the drill 4 is designed in a similar way to a so-called single lip drill. This means that the drill head 5 has on the drill tip 13 only one a cutting edge 52 extending over a part of the diameter D 51 of the drill 4. The cutting edge 52 is formed by a first cutting edge section 53 which faces the drill axis 27 and a second cutting edge section 54 which faces away from the drill axis 27, whereby a cutting edge tip 55 is formed between the two cutting edge sections 53, 54. The channel 12 for supplying the drill fluid 9 (FIG. 1) has an outlet opening 55, which is arranged in the region of a face side 57 of the drill tip 13, whereby an opening axis 58 of the outlet opening 55 or channel 12 is aligned at least almost parallel to the drill axis 27.

FIG. 3 shows a plan view of the drill head 5 of the drill 4 according to FIG. 2.

The drill 4 or the drill head 5 has a lateral cross-sectional narrowing in the form of V-shaped chip removal groove or bead 59. By means of this bead 59 on the cutting edge 52 chips produced during the drilling are removed out of the borehole 2 (FIG. 1) together with the drill fluid 9.

The bead 59 has an opening angle 60 of about 120° and extends up to the drill axis 27. On a drill side 61 facing away from the bead 59 is an rear offset 63 reducing the cross section of the drill head 5 relative to an enclosing cylinder casing surface 62 of the drill head 5. The rear offset 63 on the drill head 5 is arranged between a first cylinder casing part surface 64 and a second cylinder casing part surface 65 of the drill head 5 and the rear offset 63 is delimited laterally by the two cylinder casing part surfaces 64, 65. With respect to a direction parallel to the drill axis 27 the rear offset 63 extends over at least 50% of a length L 66 of the drill head 5. Preferably, the rear offset 63 extends in axial direction over at least 75% of the length L 66 of the drill head 5 or over the entire length L 66 of the drill head 5. According to this embodiment the rear offset 63 is designed to have a flat surface, whereby a normal to the surface 67 of the rear offset 63 with an angle halving end 68 of the opening angle 60 of the bead 59 encloses an angle 69 of about 10°. The arrangement of the rear offset 63 on the drill head 5 relative to the bead 59 is such that the angle 69 has a value from a range of −50° to +50°, preferably the angle 69 is selected to have a value from a range of −30° to +30°. Towards the drill tip 13 the rear offset 63 is designed to be continuous.

During the drilling of the borehole 2 (FIG. 1) the drill fluid 9 flows, which is transported by the channel 12 into the region of the drill head 5 and flows out through the outlet opening 56 into the region of the drill tip 13 into the borehole 2, even into the region of the rear offset 63 and fills the volume formed by said rear offset 63 and the side wall of the borehole 2 (corresponds to the enclosing cylinder casing surface 62). The drill fluid 9 located in the region of the rear offset 63 thus forms a pressure cushion which acts as the laterally acting radial force 19 on the drill head 5. If the pressure of the drill fluid 9 remains constant, the radial force 19 also remains constant and without recognisable effect over a complete rotation of 360°. Only in the case of a periodically changing pressure pattern, which is synchronous with the rotational movement of the drill 4, does the pulsing radial force 19 produce a force effect, the direction of which relative to the workpiece 3 has a constant dimensional alignment. In this way a deflecting action is exerted on the drill head 5 of the drill 4 which is directed in the corresponding dimensional direction. The design of the rear offset 63 in combination with a rotationally synchronous periodic pressure pattern of the drill fluid 9 directed into the region of the drill tip 13 makes it possible to specifically influence the longitudinal dimension of the borehole 2 (FIG. 1).

The rear offset 63 is preferably designed to have a width 70, so that the ratio of the diameter D 51 of the drill head 5 to the width 70 equals a value from a region of up to a maximum 0.8. The ratio of the diameter D 51 to the width 70 is preferably a value from a range of from 0.1 to 0.7. The ratio of the length L 66 of the drill head 5 to its diameter D 51 has a value from a range of 0.5 to 10. Preferably, the drill head 5 is shaped so that the ratio of the length L 66 to the diameter D 51 has a value from a range of from 1 to 4.

The specific influencing of the longitudinal dimension of the borehole 2 can also be supported by a special choice of the shape of the cutting edge 52 on the drill tip 13 of the drill head 5. It is provided that a first cutting edge angle 71 of the first cutting edge section 53 relative to the drill axis 27 has a value of at least 70°. Preferably, for the first cutting edge angle 71 a value of at least 80° is selected. Also a second cutting edge angle 72 which is enclosed between the second cutting edge section 54 and the drill axis 27 has a value from a range of from 20° to 90°. Preferably, for the second cutting edge angle 72 a value from a range of 35° to 80° is selected. The cutting edge tip 55 formed between the two cutting edge sections 53, 54 is spaced apart from the enclosing cylinder casing surface 62 of the drill head 5 by an edge distance 73, whereby the value of the edge distance 73 is selected preferably from a range of 1/10 to 1/3 of the diameter D 51. A value for the edge spacing 73 from a range of 1/5 to 1/4 of the diameter D 51 has proved advantageous. This design of the cutting edge 52 with the relatively large first cutting edge angle 71 enables an effective lateral deflection by radial force 19.

In a further embodiment variant of the drill head 5 of the drill 4 according to the invention, the second cutting edge section 54 is rounded on its end region 74 facing away from the drill axis 27 or the cutting edge tip 55 towards the enclosing cylinder casing surface 62. This alternative embodiment is illustrated in FIG. 2 by dashed lines. In this case the second cutting edge section 54 at this end area 74 has a radius of curvature 75 the value of which corresponds to a maximum of ½ the diameter D 51. According to the shape of the drill head 5 that is rounded towards to the enclosing cylinder casing surface 62 it is also provided that the edge of the drill tip 13 adjoining the second cutting edge section 54 and facing the enclosing cylinder casing surface 62 is also rounded and has a enclosing phase (not shown).

The diameter D 51 of the drill 4 is preferably selected from a range of 3 mm to 40 mm. Drills 4 with a diameter D 51 from of range of 4 mm to 20 mm have proved to be particularly advantageous.

By way of the following FIGS. 4 and 5 a further embodiment of the drill 4 according to the invention is described.

FIG. 4 shows a side view of the drill 4 with a second outlet opening 76 which is arranged in a surface area 77 of the rear offset 63.

FIG. 5 shows a plan view of the drill head 5 of the drill 4 according to FIG. 4. An opening axis 78 of the outlet opening 76 is aligned here parallel to the normal to the surface 67 of the rear offset 73 or the surface area 77. By allowing the drill fluid 9 (FIG. 1) to flow through this second outlet opening 76 directly into the area of the rear offset 63 any obstruction of the pressure pulses of the drill fluid 9 through the route via the front face 57 of the drill tip 13 is avoided and thus the development of radial force 19 is facilitated.

In a further embodiment variant it is possible for one or more outlet openings 76 to be formed in the drill head 5 of the drill 4 only in the region of the rear offset 63. The outlet opening 56 in the region of the face side 57 of the drill tip 13 is not provided in this alternative embodiment. In this way it is possible that when drilling with the drill 4 at least a partial flow of the drill fluid 9 is directed against a side internal wall of the borehole 2 (FIG. 1).

Figure 6:
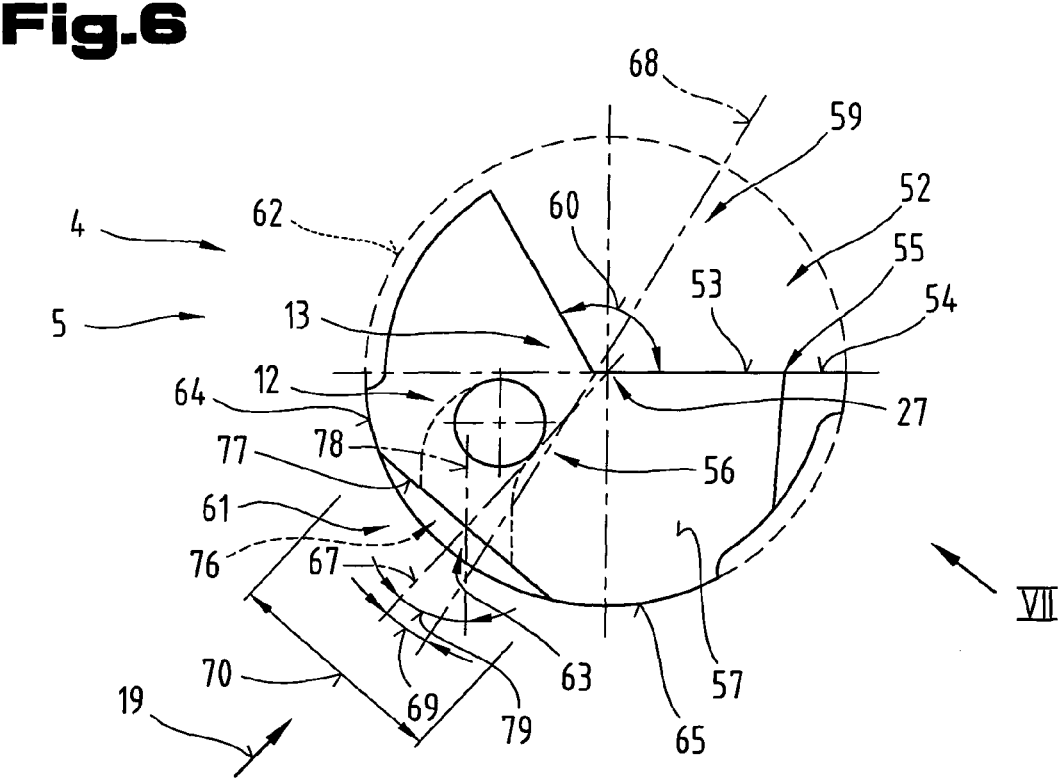
FIG. 6 shows a further embodiment of the drill.

FIG. 6 shows a further embodiment of the drill 4 with an outlet opening 76 in the region of the rear offset 63 according to FIG. 5 in plan view of the drill tip 13. The second outlet opening 76 is inclined in relation to the normal to the surface 67 of the rear offset 63, i.e. the opening axis 78 encloses with the normal to the surface 67 an angle of inclination 79 which is selected from the region of up to a maximum of 80°. The opening axis 78 of the second outlet opening 76 is preferably aligned so that the angle of inclination 79 has a value from the region of from 30° to 60°.

Figure 7:
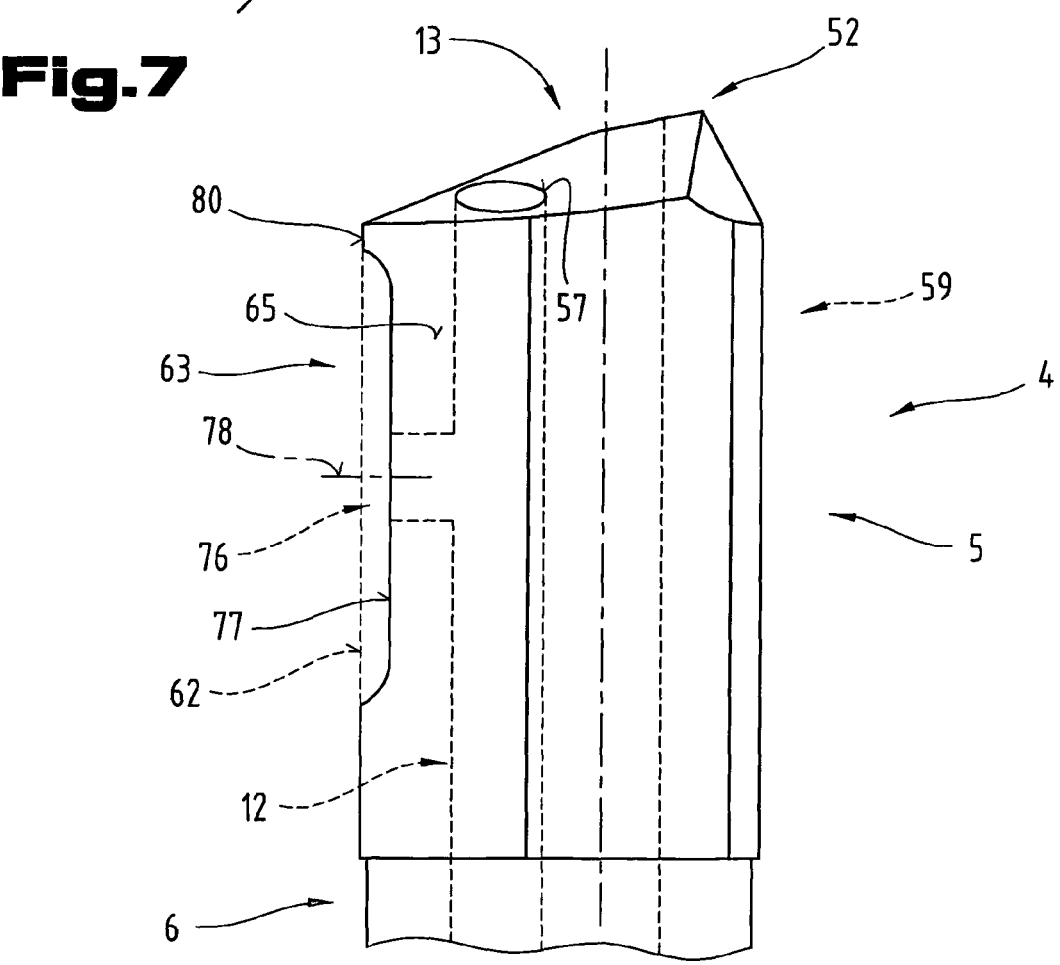
FIG. 7 shows a side view of the drill according to FIG. 6.

FIG. 7 shows a side view of the drill 4 according to FIG. 6. The rear offset 63 unlike the previously described embodiments of the drill 4 towards the drill tip 13 is delimited by a further cylinder casing part surface 80 of the enclosing cylinder casing surface 62 according to the diameter D 51. Said cylinder casing part surface 80 acts on the one hand as a guiding phase for the drill head 5 for sliding bearing against the inner wall of the borehole 2 (FIG. 1) and prevents on the other hand the drill fluid 9 from escaping from the region of the rear offset 63 via the front side 57 of the drill tip 13 towards the bead 59. By delimiting the rear offset 63 with the cylinder casing part surface 80 the formation of radial force 19 is facilitated by the introduction of pressure pulses.

In a further embodiment two or more rear offsets 63 are formed that are spaced apart from one another by intermediate cylinder casing part surfaces, whereby in the surface region 77 of the rear offset 63 an outlet opening 76 of the channel 12 is provided.

In the embodiments of the drill 4 according to FIGS. 2 to 5, the rear offset 63 is aligned parallel to the drill axis 27 or the longitudinal middle axis of the drill 4. According to an alternative embodiment of the drill 4 it is also possible for the rear offset 63 to be inclined relative to the drill axis 27.

A further embodiment of the drill 4 enables the action of a torque on the drill head 5 of the drill 4. For this next to the outlet opening 76 in the region of the rear offset 63 (FIG. 4) a further outlet opening (not shown) is arranged in a surface area of the drill head 5 formed by the bead 59. The outlet opening 76 in the region of the rear offset 63 is thereby arranged closer to the drill tip 13 than the second outlet opening in the bead 59. A pressure pulse of the drill fluid 9 introduced through the channel 12 into the region of the drill head 5 of the drill 4, due to the corresponding reaction forces on the drill head 5, has the effect of a torque. This design of the drill head 5 allows for an additional independent way of influencing the longitudinal dimension of the borehole 2 (FIG. 1).

On executing the method according to the invention for drilling deep boreholes 2 it is also intended to interrupt the drilling with the drill 4 with diameter D 51 in order to influence the longitudinal dimension of the borehole 2 and to drill a partial length of the borehole 2 by means of a drill pipe in combination with a conventional single lip drill or a drill 4 as described above. In this instance a corresponding borehole is prebored eccentrically in relation to the longitudinal middle axis of the borehole 2 (FIG. 1) with a drill, the diameter of the drill being smaller than the diameter D 51. If afterwards the drilling process is continued with the original drill 4 with diameter D 51, the drill head 5, on penetrating into the prebored borehole or on drilling the prebored borehole, experiences a deflection or radial force 19 according to the off-centre arrangement of the prebored borehole.

Figure 8:
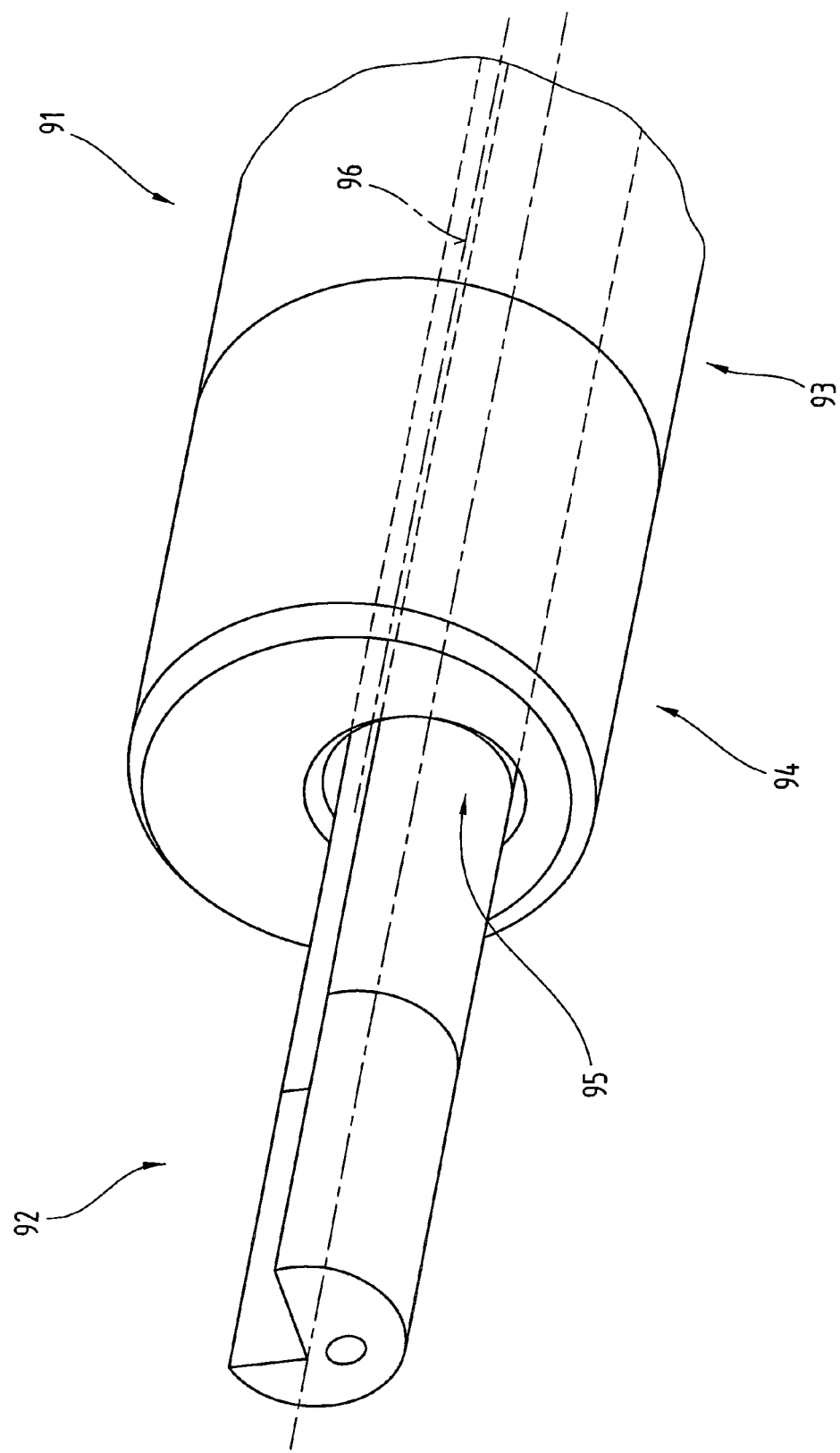
FIG. 8 shows a drill pipe with a drill for producing an eccentric prebore, in perspective view.

FIG. 8 shows a bore pipe 91 with a drill 92 for producing an eccentric prebore.

The bore pipe 91 comprises a bore bush shaft 93 in one end of which a drill bush 94 is inserted and secured. The drill bush 94 has a drill guiding hole 95 which is arranged eccentrically in relation to a longitudinal middle axis 96 of the drill bush 94. If the drill pipe 91 is now inserted into the borehole 2 (FIG. 1) and by rotating the drill guiding hole 95 is aligned accordingly, by means of the drill 92 an eccentric borehole can be prebored with a suitably smaller diameter.

Preferably, a metal pipe is used as a drill bush shaft 93, at one end region of which the drill bush 94 is inserted and is secured therein for example by adhesion.

Figure 9:
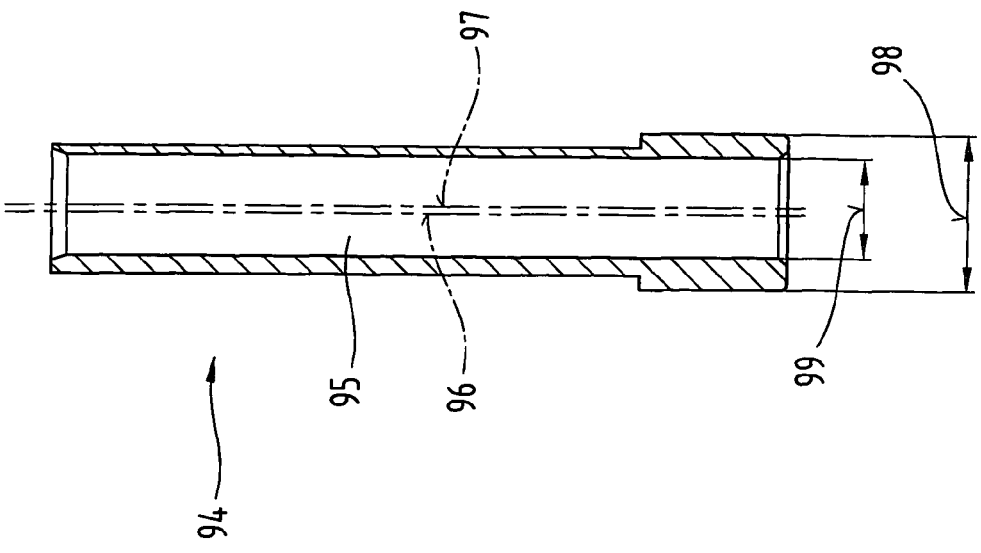
FIG. 9 shows a drill bush of the drill pipe according to FIG. 8, shown in cross section.

FIG. 9 shows a drill bush 94 of a drill pipe 91, according to FIG. 8, in cross section. The drill guiding hole 95 is arranged off-centre relative to the longitudinal middle axis 96 of the drill bush 94. According to this embodiment of the drill bush 94 an axis 97 of the drill guiding hole 95 is aligned parallel to the longitudinal middle axis 96 of the drill bush 94. An external diameter 98 of the drill bush 94 is slightly smaller than the diameter D 51 of the drill head 5 of the drill 4 (FIG. 2) and can thus be inserted into the borehole 2 (FIG. 1).

The drill guiding hole 95 is designed to have a diameter 99 which is measured so that the drill 92 (FIG. 8) can be guided through with the least possible amount of play.

Figure 10:
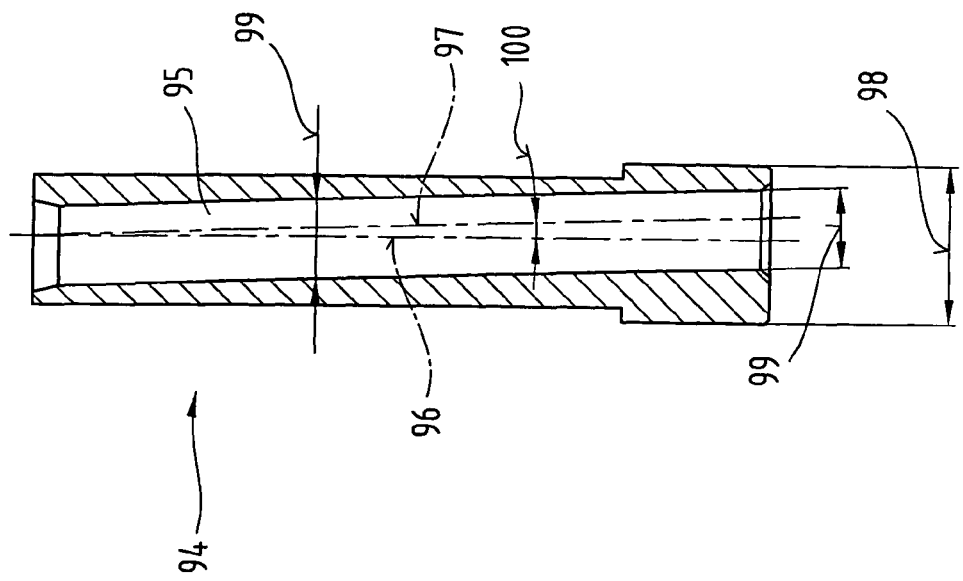
FIG. 10 shows a further embodiment of the drill bush of the drill pipe according to claim 8.

FIG. 10 shows a further embodiment of a drill bush 94 of a drill pipe 91, according to FIG. 8, in cross section.

The drill guiding hole 95 is in this embodiment of the drill bush 94 inclined relative to the longitudinal middle axis 96. This means that the axis 97 of the drill guiding hole 95 encloses with the longitudinal middle axis 96 of the drill bush 94 an angle of inclination 100. The angle of inclination 100 is selected from a range of between 0 and 5°, preferably between 0.5° and 1.5°. By means of this drill bush 94 a correspondingly oblique prebore can be produced in the borehole 2 (FIG. 1). If after the predrilling using said drill bush 94 the drilling process is continued with the original drill 4 with diameter D 51, the drill head 5 on penetrating into the prebored borehole or drilling the prebored borehole experiences a deflection or radial force 19, according to the angle of inclination 100 and the radial direction of the drill guiding hole 95 selected on inserting the drill pipe 91 into the borehole 2 (FIG. 1).

FIG. 11 shows a further embodiment of the device 1 for drilling the borehole 2 in the workpiece 3 in a schematically simplified view.

The radial force 19 is generated in this embodiment of the device 1 by electromechanical methods. For this a piezoelectric element 105 is provided on the drill head 5 of the drill 4. Via a line 106 the piezoelectric element 105 is connected with control electronics 107. In order to influence specifically the longitudinal dimension of the borehole 2 the speed or frequency of rotation of the drill 4 and the current position or alignment of the cutting edge 52 (FIG. 3) is determined by the control device 29 by picking up the data from the rotary sensor 28, and by forwarding signals to the control electronics 107 the piezoelectric element 105 is made to generate rotationally synchronous, periodic pressure pulses. The direction of the radial force 19 is adjusted, as explained above, by a corresponding selection of the time phase shift in relation to the rotational movement of the drill 4.

Also with this embodiment of the device 1 the drill fluid 9 (FIG. 1) is fed into the borehole 2 in the region of the drill head 5 of the drill 4 through the channel 12 into the drill 4 and is used in the normal way to cool and lubricate the drill 4 as well as to remove the chips. However, for a better overview a corresponding drill fluid circuit (FIG. 1) is not shown in FIG. 11.

The measuring device 30 for measuring the longitudinal dimension of the borehole 2 is designed in this embodiment of the device 1 by a measuring system using electromagnetic radiation. The measuring head 31 is also equipped with a radiation detector 108. Furthermore, on the drill head 5 an element emitting electromagnetic radiation is provided. The radial distance 32 can be measured according to a suitable calibration of the radiation detector 108 by way of the intensity of the electromagnetic radiation coming from the drill head 5. By means of the material of the workpiece 3 located between the drill head 5 and the radiation detector 108 the emitting electromagnetic radiation experiences a corresponding attenuation, which can be used as a basis for determining the radial distance 32.

Figure 12:
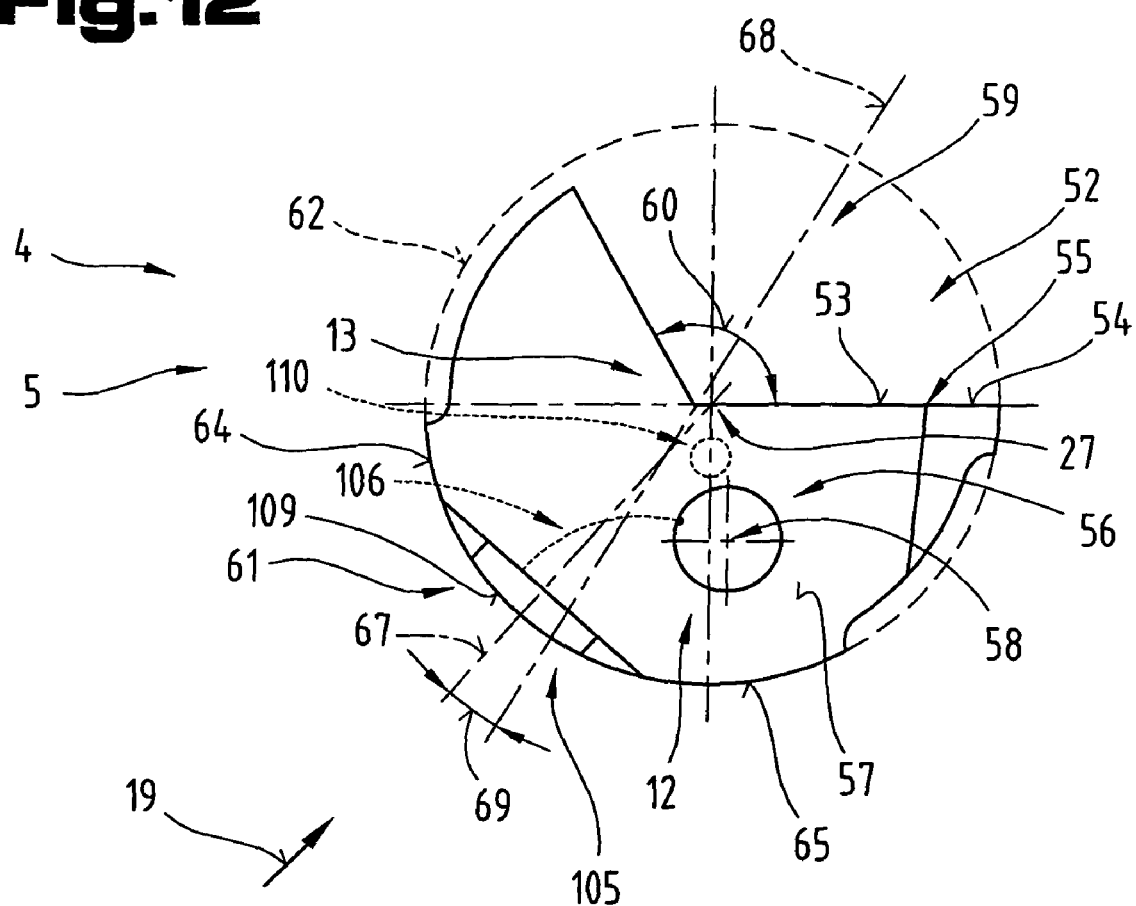
FIG. 12 shows a drill according to the embodiment of the device according to FIG. 11, in plan view of the drill tip.

FIG. 12 shows a drill 4 according to the embodiment of the device 1 according to FIG. 11.

The piezoelectric element 105 is arranged on the drill side 61 facing away from the bead 59 on the side of the drill head 5. An external bearing side 109 of the piezoelectric element 105 is thereby formed in alignment with the enclosing cylinder casing surface 62 of the drill head 5. This means that if the drill 4 is located in the borehole 2 the piezoelectric element 105 is located with its bearing side 109 on the lateral interior wall of the borehole 2 or the bearing side 109 slides on said lateral interior wall. By means of introducing suitable electric pulses, which are supplied via the line 106, the piezoelectric element 105 can be used to generate a pressure pulse or a force which is directed against the lateral interior wall of the borehole 2 (FIG. 11). The radial force 19 acts on the drill head 5 as a reaction force thereto.

In the drill head 5 an element 110 emitting electromagnetic radiation is also arranged. It is preferably positioned as close as possible to the drill axis 27. The element 110 emitting electromagnetic radiation is used in cooperation with the radiation detector 108 of the measuring device 30 (FIG. 11) to measure the longitudinal dimension of the borehole 2 or its distance 32 from the surface 33 of the workpiece 3. Preferably, a piece of an element emitting gamma radiation is used as the element 110 emitting electromagnetic radiation. The element 110 and the radiation detector 108 thus form part of a gamma radiation measuring system.

By means of the device 1 according to the invention it is thus possible to carry out a method for drilling particularly deep boreholes 2. Even at depth/diameter ratios of boreholes 2 of greater than 100 and also greater than 300, by means of this method it is still possible to influence the longitudinal direction of the borehole 2 in a specific manner.

By using the control device 29 it is possible to perform the method in a manner that is as automated as possible. A typical drilling process using the device 1 consists of the following steps. Firstly, the drilling of the borehole 2 is begun without the action of a periodic radial force 19. As the drill 4 penetrates further into the workpiece 3, at preselected Z positions (FIG. 1) or also continually the actual position of the borehole 2 can be measured by means of the measuring device 30. If by way of the measured X-Y values a deviation from the desired—usually straight—longitudinal direction of the borehole 2 can be established, the corresponding radial direction of the radial force 19 is calculated by the control device 29, which is necessary to return the longitudinal path of the borehole 2 to the desired ideal direction. This procedure can be observed by means of further, continual or even intermittent measurements of the distance 32 by means of the measuring device 30, in that the further longitudinal dimension of the borehole 2 is established by measuring the corresponding X-Y values. By means of the control device 29 thus even during the continuing drilling procedure a new calculation of the necessary radial direction of the radial force 19 and a corresponding control of the valve 26 of the drill fluid circuit 8 (FIG. 1) or control of the control electronics 107 for the piezoelectric element 105 (FIG. 11) can be carried out. The device 1 according to the invention thus forms a control circuit or a control system, in that the reaction to the path of the drill 4 to the pulsing radial force 19 is measured and the information obtained therefrom is used for readjusting the direction of the radial force 19.

Particularly if the measurement of the longitudinal dimension of the borehole reveals that the action of the radial force 19 is not sufficient in the aforementioned manner, the drilling procedure with the drill 4 can be interrupted in order to make a so-called tap hole bore using the drill pipe 91 with the drill 92 (FIG. 8). For this the drill pipe 91 with the eccentrically arranged drill guiding hole 95 of the drill bush 94 is inserted into the borehole 2 (FIG. 1) and the drill guiding hole 95 is aligned so that it is as close as possible to the desired, ideal longitudinal direction of the borehole 2. The drill 92 is then guided through the drill guiding hole 95 and drills a bore over a length which corresponds approximately to the length L 66 of the drill head 5 of the drill 4. The drill 92 and the drill pipe 91 are then removed from the borehole 2, and then the drilling process is continued by using the drill 4 with diameter D 51.

The method according to the invention is used preferably to produce boreholes 2 in a workpiece 3 that are as straight as possible. By measuring the longitudinal dimension of the borehole 2 during the drilling process or the progressive penetration of the drill 4 into the workpiece 3 and the specific action of radial force 19 on the drill head 5 of the drill 4, the so-called average deviation, i.e. the deviation of the borehole 2 from the ideal, straight longitudinal direction can be kept as low as possible. Of course, it is also possible by means of the method according to the invention to produce a borehole 2 with a curved, i.e. not straight longitudinal dimension.

The exemplary embodiments show possible embodiment variants of the device 1 for drilling deep boreholes 2, whereby it should be noted at this point that the invention is not restricted to the specifically illustrated embodiment variants but rather various combinations of the individual embodiments are possible and due to the teaching on technical procedure in the present invention these would be within the ability of a person skilled in this technical. Thus all conceivable embodiment variants, which are possible by combining individual details of the embodiment variants shown and described, are also covered by the scope of protection.

Lastly, for form's sake it should be noted that for a better understanding of the structure of the device 1 for drilling deep boreholes 2, the latter or its components have not been represented true to scale and/or have been enlarged and/or reduced in size.

The underlying objective of the independent solutions of the invention can be taken from the description.

Mostly, the individual embodiments shown in detail in FIGS. 1; 2, 3; 4, 5; 6, 7; 8, 9, 10; 11; 12 can form the subject matter of independent solutions according to the invention. The relevant objectives and solutions according to the invention can be taken from the detailed descriptions of these figures.

LIST OF REFERENCE NUMBERS

1 Device
2 Borehole
3 Workpiece
4 Drill
5 Drill head
6 Drill shaft
7 Drill Spindle
8 Drill fluid circuit
9 Drill fluid
10 Tank
11 Pump
12 Channel
13 Drill tip
14 Collection container
15 Coarse filter
16 Fine filter
17 Rotary transfer
18 Supply line
19 Radial force
25 Pulse line
26 Valve
27 Drill axis
28 Rotary sensor
29 Control device
30 Measuring device
31 Measuring head
32 Distance
33 Surface
34 Measuring head support
35 Depth
36 Ultrasound transmission
37 Ultrasound receiver
38 Pressure sensor
51 Diameter D
52 Cutting edge
53 Cutting edge section
54 Cutting edge section
55 Cutting edge tip
56 Outlet opening
57 Face side
58 Opening axis
59 Bead
60 Opening angle
61 Drill side 62 Cylinder casing surface
63 Rear offset
64 Cylinder casing surface
65 Cylinder casing part surface
66 Length L
67 Normal to the surface
68 Angle halving end
69 Angle
70 Width
71 Cutting edge angle
72 Cutting edge angle
73 Edge distance
74 End area
75 Radius of curvature
76 Outlet opening
77 Surface area
78 Opening axis
79 Inclination angle
80 Cylinder casing surface
91 Drill pipe
92 Drill
93 Drill bush shaft
94 Drill bush
95 Drill guiding hole
96 Longitudinal middle axis
97 Axis
98 Diameter
99 Diameter
100 Angle of inclination
105 Element
106 Line
107 Control electronics
108 Radiation detector
109 Bearing side
110 Element

The invention claimed is:

1. Drill (4) with a drill head (5) with a diameter D (51), in which the drill head (5) on a drill tip (13) has only one cutting edge (52) extending over part of the diameter D (51), and with a lateral, V-shaped chip removing groove or bead (59) and with a channel (12) with an outlet opening (56) in the drill head (5) for supplying a drill fluid (9), wherein on a drill side (61) of the drill head (5) facing away from the bead (59) between a first and a second cylinder casing part surface (64, 65) of the drill head (5) there is a rear offset (63) reducing the cross section of the drill head (5) relative to an enclosing cylinder casing surface (62) of the drill head (5), whereby the rear offset (63) is designed to have an at least approximately even surface and is arranged in an end section (74) of the drill head (5) facing the drill tip (13), and extends in axial direction, and whereby a normal to the surface (67) of the rear offset (63) with an angle halving end (68) of the bead (59) encloses an angle (69), whereby said angle (69) has a value from a range of −50° to +50°, wherein a second outlet opening (76) is arranged in a surface area (77) of the drill head (5) formed by the rear offset (63).

2. Drill according to claim 1, wherein a ratio of the length of the drill head (5) to its diameter D (51) has a value from a range of 0.5 to 10.

3. Drill according to claim 2, wherein the ratio of the length of the drill head (5) to its diameter D (51) has a value from a range of 1 to 4.

4. Drill according to claim 1, wherein the angle (69) has a value from a range of from −30° to +30°.

5. Drill according to claim 1, wherein the rear offset (63) has a width (70), whereby the ratio of the diameter D (51) and the width (70) has a value from a range of 0.1 to 0.8.

6. Drill according to claim 1, wherein the rear offset (63) runs continuously in the direction of the drill tip (13).

7. Drill according to claim 1, wherein the rear offset (63) is aligned parallel in relation to a drill axis (27) of the drill head (5).

8. Drill according to claim 1, wherein two or more rear offsets (63) are formed spaced apart from one another by interlying cylinder casing part surfaces (64, 65).

9. Drill according to claim 1, wherein the drill head (5) is designed to have a cutting edge (52) with a first cutting edge section (53) and with a second cutting edge section (54), whereby the first cutting edge section (53) faces a drill axis (27) of the drill head (5) and the second cutting edge section (54) faces away from the drill axis (27) of the drill head (5), and the first cutting edge section (53) with the drill axis (27) encloses a first cutting edge angle (71) of at least 70°.

10. Drill according to claim 9, wherein the first cutting edge angle (71) is at least 80°.

11. Drill according to claim 9, wherein the second cutting edge section (54) with the drill axis (27) encloses a second cutting edge angle (71), whereby the second cutting edge angle (71) has a value from a range of 20° to 90°.

12. Drill according to claim 11, wherein the second cutting edge angle (71) has a value from a range of 35° to 80°.

13. Drill according to claim 9, wherein a cutting edge tip (55) formed by the two cutting edge sections (53, 54) has a minimal edge distance (73) relative to an enclosing cylinder casing surface (62) of the drill head (5), which has a value from a range of 1/10 to 1/3 of diameter D (51).

14. Drill according to claim 13, wherein the edge distance (73) has a value from a range of 1/5 to 1/4 of the diameter D (51).

15. Drill according to claim 9, wherein an end region (74) of the second cutting edge section (54) facing away from the drill axis (27) of the drill head (5) or the cutting edge tip (55) is designed to be rounded towards the enclosing cylinder casing surface (62) of the drill head (5).

16. Drill according to claim 15, wherein the end region (74) of the second cutting edge section (54) facing away from the cutting edge tip (55) has a radius of curvature (75) of up to the diameter D (51).

17. Drill according to claim 1, wherein the diameter D (51) of the drill head (5) has a value from a range of 3 mm to 40 mm.

18. Drill according to claim 1, wherein the diameter D (51) of the drill head (5) has a value from a range of 4 mm to 20 mm.

19. Drill according to claim 1, wherein an opening axis (58) of the second outlet opening (76) is inclined in relation to the normal to the surface (67) of the rear offset (63).

20. Drill according to claim 19, wherein an angle of inclination (79) of the opening axis (58) relative to the normal to surface (67) of the rear offset (63) has a value from a range of 0° to 80°.

21. Drill according to claim 19, wherein the angle of inclination (79) of the opening axis (58) has a value from a range of 30° to 60°.

22. Drill according to claim 21, wherein the second outlet opening (76) is in an area of the drill head (5) closer to the drill tip (13) and a further outlet opening (56) is arranged in a surface area (77) of the drill head (5) formed by the bead (59), whereby said further outlet opening (56) lies in a region of the drill head (5) positioned further away from the drill tip (13).

23. Drill according to claim 1, wherein on the drill side (61) of the drill head (5) facing away from the bead (59) or in the rear offset (63) a piezoelectric element (105) is arranged.

24. Drill according to claim 23, wherein the piezoelectric element (105) is designed to have a bearing side (109), whereby the bearing side (109) is designed to be in alignment with the enclosing cylinder casing surface (62) of the drill head (5).

25. Drill with a drill head (5) with a diameter D (51), in which the drill head (5) on a drill tip (13) has only one cutting edge (52) extending over part of the diameter D (51), and with a lateral, V-shaped chip removing groove or bead (59) and with a channel (12) with an outlet opening (56) in the drill head (5) for supplying a drill fluid (9), whereby on a drill side (61) of the drill head (5) facing away from the bead (59) between a first and a second cylinder casing part surface (64, 65) of the drill head (5) there is a rear offset (63) reducing the cross section of the drill head (5) relative to an enclosing cylinder casing surface (62) of the drill head (5), wherein the drill head (5) has an element (110) emitting electromagnetic radiation.

26. Drill according to claim 25, wherein the element (110) emitting electromagnetic radiation is formed by a piece of a chemical element emitting gamma radiation.

27. Device (1) for drilling a borehole (2) in a workpiece (3) with a diameter D (51) of a drill (4) and a depth (35) of the borehole (2), whereby the ratio of the depth (35) to the diameter D (51) is greater than 100, with a drill spindle (7) and with a drill (4) comprising a drill head (5), a drill shaft (6) and a channel (12) for supplying a drill fluid (9) and with a drill fluid circuit (8) for the drill fluid (9), whereby the drill fluid circuit (8) comprises at least one pump (11) and a supply line (18) and with a rotary transfer (17) on the drill spindle (7) for supplying the drill fluid (9) into the channel (12) of the drill (4), wherein the drill head (5) on a drill tip (13) has only one cutting edge (52) extending over part of the diameter D (51), wherein the drill (4) has a lateral, V-shaped chip removing groove or bead (59), wherein the channel (12) has an outlet opening (56) in the drill head (5) for supplying the drill fluid (9), wherein on a drill side (61) of the drill head (5) facing away from the bead (59) between a first and a second cylinder casing part surface (64, 65) of the drill head (5) there is a rear offset (63) reducing the cross section of the drill head (5) relative to an enclosing cylinder casing surface (62) of the drill head (5), whereby the rear offset (63) is designed to have an at least approximately even surface and is arranged in an end section (74) of the drill head (5) facing the drill tip (13), and extends in axial direction, and whereby a normal to the surface (67) of the rear offset (63) with an angle halving end (68) of the bead (59) encloses an angle (69), whereby said angle (69) has a value from a range of −50° to +50°, wherein a second outlet opening (76) is arranged in a surface area (77) of the drill head (5) formed by the rear offset (63).

28. Device according to claim 27, wherein the drill fluid circuit (8) comprises a pulse line (25) with a valve (26), whereby the pulse line (25) branches off from the supply line (18) immediately prior to rotary transfer (17).

29. Device according to claim 28, wherein the valve (26) is in the form of a servovalve.

30. Device according to claim 27, wherein the drill fluid circuit (8) comprises a filter device with a coarse filter (15) and/or a fine filter (16) for the drill fluid (9).

31. Device according to claim 28, wherein at least the supply line (18) and/or the pulse line (25) of the drill fluid circuit (8) are formed by lines (106) with high resistance to radial and longitudinal extension.

32. Device according to claim 27, wherein the drill fluid circuit (8) is designed for drill fluid (9) pressure of in the region of up to 60 bar.

33. Device according to claim 32, wherein the drill fluid circuit (8) is designed for drill fluid (9) pressure of in the region of up to 160 bar.

34. Device according to claim 32, wherein the drill fluid circuit (8) is designed for drill fluid (9) pressure of in the region of up to 300 bar.

35. Device according to claim 32, wherein the drill fluid circuit (8) is designed for drill fluid (9) pressure of in the region of up to 600 bar.

36. Device according to claim 32, wherein the drill fluid circuit (8) is designed for drill fluid (9) pressure of in the region of up to 4,000 bar.

37. Device according to claim 32, wherein the drill fluid circuit (8) is designed for drill fluid (9) pressure of in the region of more than 4,000 bar.

38. Device according to claim 27, further comprising a rotary sensor (28) for measuring the rotational speed or the angular speed of the drill (4) and the current position of a cutting edge (52) of the drill (4).

39. Device according to claim 27, wherein a measuring device (30) is provided for measuring the longitudinal dimension of the borehole (2).

40. Device according to claim 38, wherein it includes a control device (29), which is connected to the rotary sensor (28), the measuring device (30) and the valve (26).

41. Device according to claim 27, wherein the measuring device (30) comprises a measuring head support (34) for changing the spatial position and the alignment of a measuring head (31).

42. Device according to claim 41, wherein the measuring device (30) comprises a position measuring device for measuring the spatial position of the measuring head support and the measuring head (31).

43. Device according to claim 41, wherein on the measuring head support at least one ultrasound transmitter (36) and at least one ultrasound receiver (37) are arranged.

44. Device according to claim 43, wherein the ultrasound transmitter (36) and the ultrasound receiver (37) are arranged in a common ultrasound measuring head.

45. Device according to claim 41, wherein on the measuring head support (34) a radiation detector (108) is arranged for measuring electromagnetic radiation, and in the drill head (5) an element (110) emitting electromagnetic radiation is arranged.

46. Device according to claim 45, wherein the radiation detector (108) is designed at least for measuring the intensity of gamma radiation, and the element (110) is formed by a piece of a chemical element emitting gamma radiation.

47. Device according to claim 27, further comprising a drill pipe (91) with a drill bush (94) and drill bush shaft (93), whereby in the drill bush (94) an eccentrically arranged drill guiding hole (95) is formed.

48. Device according to claim 47, wherein the drill guiding hole (95) is inclined relative to a longitudinal middle axis (96) of the drill bush (94).

49. Device according to claim 47, wherein an axis (97) of the drill guiding hole (95) and the longitudinal middle axis (96) of the drill bush (94) enclose an angle of inclination (79), the value of which is selected from a range of between 0° and 5°.

50. Device according to claim 49, wherein the angle of inclination (79) between the axis (97) of the drill guiding hole (95) and the longitudinal middle axis (6) of the drill bush (94) is selected from a range of between 0.5° and 1.5°.

51. Device for drilling a borehole (2) in a workpiece (3) with a diameter D (51) of a drill (4) and a depth (35) of the borehole (2), whereby the ratio of depth (35) to diameter D (51) is greater than 100, with a drill spindle (7) and a drill (4) comprising a drill head (5), a drill shaft (6) and a channel (12) for supplying drill fluid (9), and with a drill fluid circuit (8) for the drill fluid (9), whereby the drill fluid circuit (8) comprises at least one pump (11) and a supply line (18) and with a rotary transfer (17) on the drill spindle (7) for supplying drill fluid (9) into the channel (12) of the drill (4), wherein the drill head (5) on a drill tip (13) has only one cutting edge (52) extending over part of the diameter D (51), wherein the drill (4) has a lateral, V-shaped chip removing groove or bead (59), wherein the channel (12) has an outlet opening (56) in the drill head (5) for supplying the drill fluid (9), wherein on a drill side (61) of the drill head (5) facing away from the bead (59) between a first and a second cylinder casing part surface (64, 65) of the drill head (5) there is a rear offset (63) reducing the cross section of the drill head (5) relative to an enclosing cylinder casing surface (62) of the drill head (5), whereby the rear offset (63) is designed to have an at least approximately even surface and is arranged in an end section (74) of the drill head (5) facing the drill tip (13), and extends in axial direction, and whereby a normal to the surface (67) of the rear offset (63) with an angle halving end (68) of the bead (59) encloses an angle (69), whereby said angle (69) has a value from a range of −50° to +50°, wherein on the drill side (61) of the drill head (5) facing away from the bead (59) or in the rear offset (63) a piezoelectric element (105) is arranged.

52. Device according to claim 51, further comprising a rotary sensor (28) for measuring the speed or the angular speed of the drill (4) and the current position of a cutting edge (52) of the drill (4).

53. Device according to claim 51, wherein a measuring device (30) is designed to measure the longitudinal dimension of the borehole (2).

54. Device according to claim 52, wherein it includes a control device (29), which is connected with the rotary sensor (28) and the measuring device (30).

55. Device according to claim 51, wherein the measuring device (30) comprises a measuring head support (34) for changing the spatial position and the alignment of a measuring head (31).

56. Device according to claim 55, wherein the measuring device (30) comprises a position measuring device for measuring the spatial position of the measuring head support (34) and the measuring head (31).

57. Device according to claim 55, wherein on the measuring head support (34) at least one ultrasound transmitter (36) and at least one ultrasound receiver (37) are arranged.

58. Device according to claim 57, wherein the ultrasound transmitter (36) and the ultrasound receiver (37) are arranged in a common ultrasound measuring head.

59. Device according to claim 55, wherein on the measuring head support (34) a radiation detector (108) is arranged for measuring electromagnetic radiation and in the drill head (5) an element (110) emitting electromagnetic radiation is arranged.

60. Device according to claim 59, wherein the radiation detector (108) is designed at least for measuring the intensity of gamma radiation and the element (110) is formed by a piece of a chemical element emitting gamma radiation.

61. Device according to claim 51, further comprising a drill pipe (91) with a drill bush (94) and drill bush shaft (93), whereby in the drill bush (94) an eccentrically arranged drill guiding hole (95) is formed.

62. Device according to claim 51, wherein the drill guiding hole (95) is aligned to be inclined relative to a longitudinal middle axis (96) of the drill bush (94).

63. Device according to claim 51, wherein an axis (97) of the drill guiding hole (95) and the longitudinal middle axis (96) of the drill bush (94) enclose an angle of inclination (79) which is selected from a range of between 0° and 5°.

64. Device according to claim 51, wherein the angle of inclination (79) between the axis of the drill guiding hole (5) and the longitudinal middle axis (96) of the drill bush (94) is selected from a range of between 0.5° and 1.5°.

65. Method for drilling deep boreholes in workpieces (3) with a drill (4) with a drill head (5) in the shape of a single lip drill and with a lateral, V-shaped chip removing groove or bead (59) and with a channel (12) with an outlet opening (56) in the drill head (5) for supplying a drill fluid (9), wherein with the drill head (5) on a drill side (61) of the drill head (5) facing away from the bead (59) between a first and a second cylinder casing part surface (64, 65) of the drill head (5) a rear offset (63) is formed reducing the cross section of the drill head (5) in relation to an enclosing cylinder casing surface (62) of the drill head (5), and on the drill head (5) a radial force (19) is exerted acting periodically over a predeterminable rotational angular area, whereby the radial force (19) is generated by a pressure cushion which is formed by the drill fluid (9) located in the region of a volume formed by the rear offset (63) and a side wall of the borehole (2).

66. Method according to claim 65, wherein during the drilling process the longitudinal dimension of the borehole (2) is measured.

67. Method according to claim 66, wherein the longitudinal dimension of the borehole (2) is measured by means of ultrasound.

68. Method according to claim 66, wherein the longitudinal dimension of the borehole (2) is measured by means of electromagnetic radiation.

69. Method according to claim 68, wherein the longitudinal dimension of the borehole (2) is measured by means of a gamma radiation transmitter arranged on the drill head (5) of the drill (4).

70. Method according to claim 65, wherein from the values taken from measuring the longitudinal dimension of the borehole (2) the direction and the extent of the average deviation of the borehole (2) are calculated.

71. Method according to claim 65, wherein a measurement is taken of the speed or angular velocity and current position or alignment of a cutting edge (52) of the drill (4).

72. Method according to claim 71, wherein from the current position or alignment of the cutting edge (52) of the drill (4) and the direction and extent of the average deviation of the borehole (2) a time characteristic of the periodic change in radial force (19) is calculated.

73. Method according to claim 72, wherein the ratio of a frequency corresponding to the rotation of the drill (4) and a frequency of the time characteristic of the periodic change in the radial force (19) is an integer.

74. Method according to claim 73, wherein the frequency relating to the rotation of the drill (4) and the frequency of the time characteristic of the periodic change of radial force (19) are equal.

75. Method according to claim 65, wherein the drilling procedure using the drill (4) with diameter D (51) is interrupted and drilling is continued with a drill (92) with a diameter (99), which is smaller than diameter D (51) and which is guided in an eccentrically arranged drill guiding hole (95) of a drill pipe (91), whereby a drill bush (94) of the drill pipe (91) has an external diameter (98), which is slightly smaller than diameter D (51).

76. Method according to claim 75, wherein the drill guiding hole (95) is aligned obliquely relative to a longitudinal middle axis (96) of the drill bush (94).

77. Method according to claim 75, wherein an axis (97) of the drill guiding hole (95) and the longitudinal middle axis

(96) of the drill bush (94) enclose an angle of inclination (79), which is selected from a range of between 0° and 5°.

78. Method according to claim 77, wherein the angle of inclination (79) between the axis of the drill guiding hole (5) and the longitudinal middle axis (96) of the drill bush (94) is selected from a range of between 0.5° and 1.5°.

79. Method according to claim 65, wherein at least a partial flow of the drill fluid (9) is directed in a discharge direction against a lateral interior wall of the borehole (2).

80. Method according to claim 65, wherein the pressure of the drill fluid (9) is changed according to the calculated time characteristic.

81. Method according to claim 65, wherein the change in pressure is carried out by controlling a valve (26) that reduces the pressure.

82. Method according to claim 81, wherein a servovalve is used for the valve (26).

83. Method according to claim 65, wherein to supply the drill fluid (9) to the drill (4) lines (106) are used that are highly resistant to radial and longitudinal extension or have a high elasticity module.

84. Method according to claim 65, wherein the pressure used is in the region of at least 60 bar.

85. Method according to claim 84, wherein the pressure used is in the region of at least 160 bar.

86. Method according to claim 85, wherein the pressure used is in the region of at least 300 bar.

87. Method according to claim 86, wherein the pressure used is in the region of at least 600 bar.

88. Method according to claim 87, wherein the pressure used is in the region of at least 4,000 bar.

89. Method according to claim 65, wherein the drill fluid (9) used has a viscosity at 40° C. of in the region of a maximum of 30 mm$^2$/s.

90. Method according to claim 89, wherein the drill fluid (9) used has a viscosity at 40° C. of in the region of a maximum of 22 mm$^2$/s.

91. Method according to claim 65, wherein the drill head (5) of the drill (4) includes an element (110) emitting electromagnetic radiation.

92. Method for drilling deep boreholes in workpieces (3) with a drill (4) with a drill head (5) in the shape of a single lip drill and with a lateral, V-shaped chip removing groove or bead (59) and with a channel (12) with an outlet opening (56) in the drill head (5) for supplying a drill fluid (9), wherein with the drill head (5) on a drill side (61) of the drill head (5) facing away from the bead (59) between a first and a second cylinder casing part surface (64, 65) of the drill head (5) a rear offset (63) is formed reducing the cross section of the drill head (5) in relation to an enclosing cylinder casing surface (62) of the drill head (5), and on the drill head (5) a radial force (19) is exerted acting periodically over a predeterminable rotational angular area, whereby the radial force (19) is generated by a piezoelectric element (105) arranged in the rear offset (63).

93. Drill (4) with a drill head (5) with a diameter D (51), in which the drill head (5) on a drill tip (13) has only one cutting edge (52) extending over part of the diameter D (51), and with a lateral, V-shaped chip removing groove or bead (59) and with a channel (12) with an outlet opening (56) in the drill head (5) for supplying a drill fluid (9), wherein on a drill side (61) of the drill head (5) facing away from the bead (59) between a first and a second cylinder casing part surface (64, 65) of the drill head (5) there is a rear offset (63) reducing the cross section of the drill head (5) relative to an enclosing cylinder casing surface (62) of the drill head (5), whereby the rear offset (63) is designed to have an at least approximately even surface and is arranged in an end section (74) of the drill head (5) facing the drill tip (13), and extends in axial direction, and whereby a normal to the surface (67) of the rear offset (63) with an angle halving end (68) of the bead (59) encloses an angle (69), whereby said angle (69) has a value from a range of −50° to +50°, wherein the cutting edge (52) has a first cutting edge section (53) and a second cutting edge section (54), whereby the first cutting edge section (53) faces a drill axis (27) of the drill head (5) and the second cutting edge section (54) faces away from the drill axis (27) of the drill head (5), and the first cutting edge section (53) with the drill axis (27) encloses a first cutting edge angle (71) of at least 70°, wherein the end region (74) of the second cutting edge section (54) facing away from the drill axis (27) of the drill head (5) or the cutting edge tip (55) is designed to be rounded towards the enclosing cylinder casing surface (62) of the drill head (5).

94. Drill according to claim 93, wherein the end region (74) of the second cutting edge section (54) facing away from the cutting edge tip (55) has a radius of curvature (75) of up to % the diameter D (51).

95. Drill (4) with a drill head (5) with a diameter D (51), in which the drill head (5) on a drill tip (13) has only one cutting edge (52) extending over part of the diameter D (51), and with a lateral, V-shaped chip removing groove or bead (59) and with a channel (12) with an outlet opening (56) in the drill head (5) for supplying a drill fluid (9), wherein on a drill side (61) of the drill head (5) facing away from the bead (59) between a first and a second cylinder casing part surface (64, 65) of the drill head (5) there is a rear offset (63) reducing the cross section of the drill head (5) relative to an enclosing cylinder casing surface (62) of the drill head (5), whereby the rear offset (63) is designed to have an at least approximately even surface and is arranged in an end section (74) of the drill head (5) facing the drill tip (13), and extends in axial direction, and whereby a normal to the surface (67) of the rear offset (63) with an angle halving end (68) of the bead (59) encloses an angle (69), whereby said angle (69) has a value from a range of −50° to +50°, wherein on the drill side (61) of the drill head (5) facing away from the bead (59) or in the rear offset (63) a piezoelectric element (105) is arranged.

96. Device (1) for drilling a borehole (2) in a workpiece (3) with a diameter D (51) of a drill (4) and a depth (35) of the borehole (2), whereby the ratio of the depth (35) to the diameter D (51) is greater than 100, with a drill spindle (7) and with a drill (4) comprising a drill head (5), a drill shaft (6) and a channel (12) for supplying a drill fluid (9) and with a drill fluid circuit (8) for the drill fluid (9), whereby the drill fluid circuit (8) comprises at least one pump (11) and a supply line (18) and with a rotary transfer (17) on the drill spindle (7) for supplying the drill fluid (9) into the channel (12) of the drill (4), wherein the drill head (5) on a drill tip (13) has only one cutting edge (52) extending over part of the diameter D (51), wherein the drill (4) has a lateral, V-shaped chip removing groove or bead (59), wherein the channel (12) has an outlet opening (56) in the drill head (5) for supplying the drill fluid (9), wherein on a drill side (61) of the drill head (5) facing away from the bead (59) between a first and a second cylinder casing part surface (64, 65) of the drill head (5) there is a rear offset (63) reducing the cross section of the drill head (5) relative to an enclosing cylinder casing surface (62) of the drill head (5), whereby the rear offset (63) is designed to have an at least approximately even surface and is arranged in an end section (74) of the drill head (5) facing the drill tip (13), and extends in axial direction, and whereby a normal to the surface (67) of the rear offset (63) with an angle halving end (68) of the bead (59) encloses an angle (69), whereby said angle (69) has a value from a range of −50° to +50°, wherein the drill head (5) is designed to have a cutting edge (52) with a first cutting edge section (53) and with a second cutting edge section (54), whereby the first cutting edge section (53) faces a drill axis (27) of the drill head (5) and the second cutting edge section (54) faces away from the drill axis (27) of the drill head (5), and the first cutting edge section (53) with the drill axis (27) encloses a first cutting edge angle (71) of at least 70°, wherein an end region (74) of the second cutting edge section (54) facing away from the drill axis (27) of the drill head (5) or the cutting edge tip (55) is designed to be rounded towards the enclosing cylinder casing surface (62) of the drill head (5).

* * * * *

UNITED STATES PATENT AND TRADEMARK OFFICE
CERTIFICATE OF CORRECTION

| | | |
|---|---|---|
| PATENT NO. | : 7,824,135 B2 | Page 1 of 1 |
| APPLICATION NO. | : 10/588040 | |
| DATED | : November 2, 2010 | |
| INVENTOR(S) | : Radkowitsch et al. | |

It is certified that error appears in the above-identified patent and that said Letters Patent is hereby corrected as shown below:

In Column 16, line 39, (Line 3 of Claim 16) after the word "to", please insert: --½--.

In Column 22, line 19, (Line 3 of Claim 94) after the word "to", please change "%" to correctly read: --½--.

Signed and Sealed this
Third Day of April, 2012

David J. Kappos
*Director of the United States Patent and Trademark Office*